(12) United States Patent
Izumi et al.

(10) Patent No.: US 11,047,424 B2
(45) Date of Patent: Jun. 29, 2021

(54) OLDHAM COUPLING

(71) Applicant: Jeco Co., Ltd., Saitama (JP)

(72) Inventors: Hikoshi Izumi, Saitama (JP);
Yoshiyuki Ariki, Saitama (JP); Yuta Muneyoshi, Saitama (JP); Taiki Miyokawa, Saitama (JP)

(73) Assignee: Jeco Co., Ltd., Saitama (JP)

( * ) Notice: Subject to any disclaimer, the term of this patent is extended or adjusted under 35 U.S.C. 154(b) by 487 days.

(21) Appl. No.: 16/041,057

(22) Filed: Jul. 20, 2018

(65) Prior Publication Data
US 2018/0328412 A1 Nov. 15, 2018

Related U.S. Application Data

(63) Continuation of application No. PCT/JP2017/035866, filed on Oct. 2, 2017.

(30) Foreign Application Priority Data

Jan. 12, 2017 (JP) .............................. JP2017-003654

(51) Int. Cl.
*F16D 3/04* (2006.01)

(52) U.S. Cl.
CPC .......... *F16D 3/04* (2013.01); *F16D 2300/021* (2013.01)

(58) Field of Classification Search
CPC ............................ F16D 3/04; F16D 2300/021
USPC ............... 464/17, 102, 104, 105; 251/129.11
See application file for complete search history.

(56) References Cited

U.S. PATENT DOCUMENTS

| 1,916,391 | A | * | 7/1933 | Shamberger | F16D 3/04 464/105 |
|---|---|---|---|---|---|
| 5,284,455 | A | | 2/1994 | Kuribayashi | |
| 2004/0074468 | A1 | | 4/2004 | Makino et al. | |
| 2013/0270470 | A1 | | 10/2013 | Bonanno et al. | |
| 2013/0278249 | A1 | | 10/2013 | Kagawa et al. | |

FOREIGN PATENT DOCUMENTS

| JP | H2-062730 | 3/1990 |
|---|---|---|
| JP | H6-20925 U | 3/1994 |
| JP | 2004-036823 | 2/2004 |

(Continued)

OTHER PUBLICATIONS

International Search Report for PCT/JP2017/035866 dated Dec. 19, 2017.

*Primary Examiner* — Greg Binda
(74) *Attorney, Agent, or Firm* — IPUSA, PLLC

(57) ABSTRACT

In an Oldham coupling, a first protruding part, protruding in a coaxial direction parallel to and extending in a first direction, is provided in one of first and second members, and the other of the first and second members includes a first notch part fitted to the first protruding part and slidable in the first direction along the first protruding part. A second notch part, extending in a second direction perpendicular to the first direction, is formed in one of second and third members, and the other of the second and third members includes a second protruding part fitted to the second notch part and slidable in the second direction along the second notch part. At least one of the first, second, and the third members has a heat dissipating structure including mutually separated concentric hollow cylinders of different diameters, connected by a bridge part.

13 Claims, 16 Drawing Sheets

(56) References Cited

FOREIGN PATENT DOCUMENTS

| JP | 2004-092621 | 3/2004 |
| JP | 2007-285356 | 11/2007 |
| JP | 2010-249151 | 11/2010 |
| JP | 4889469 | 3/2012 |
| JP | 2015-001177 | 1/2015 |
| JP | 5692147 | 4/2015 |

* cited by examiner

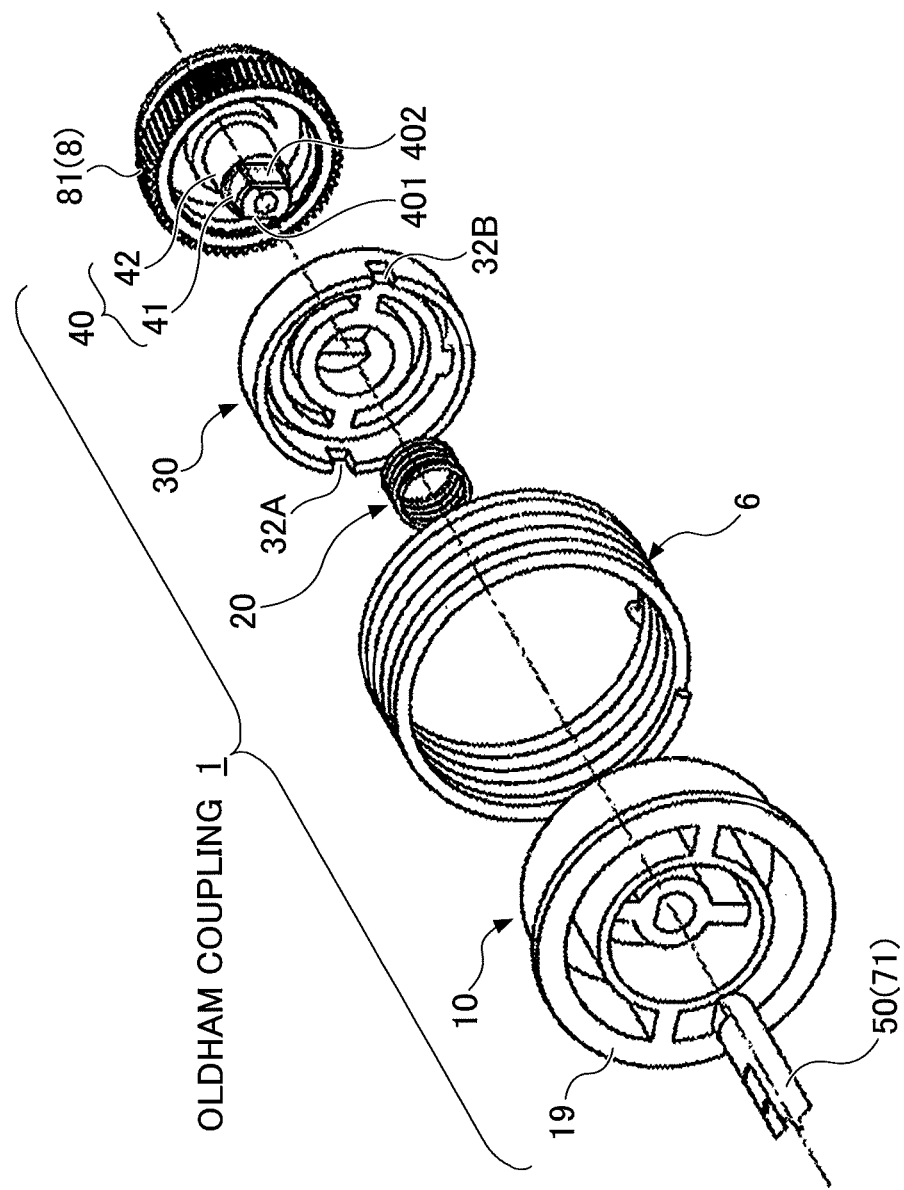

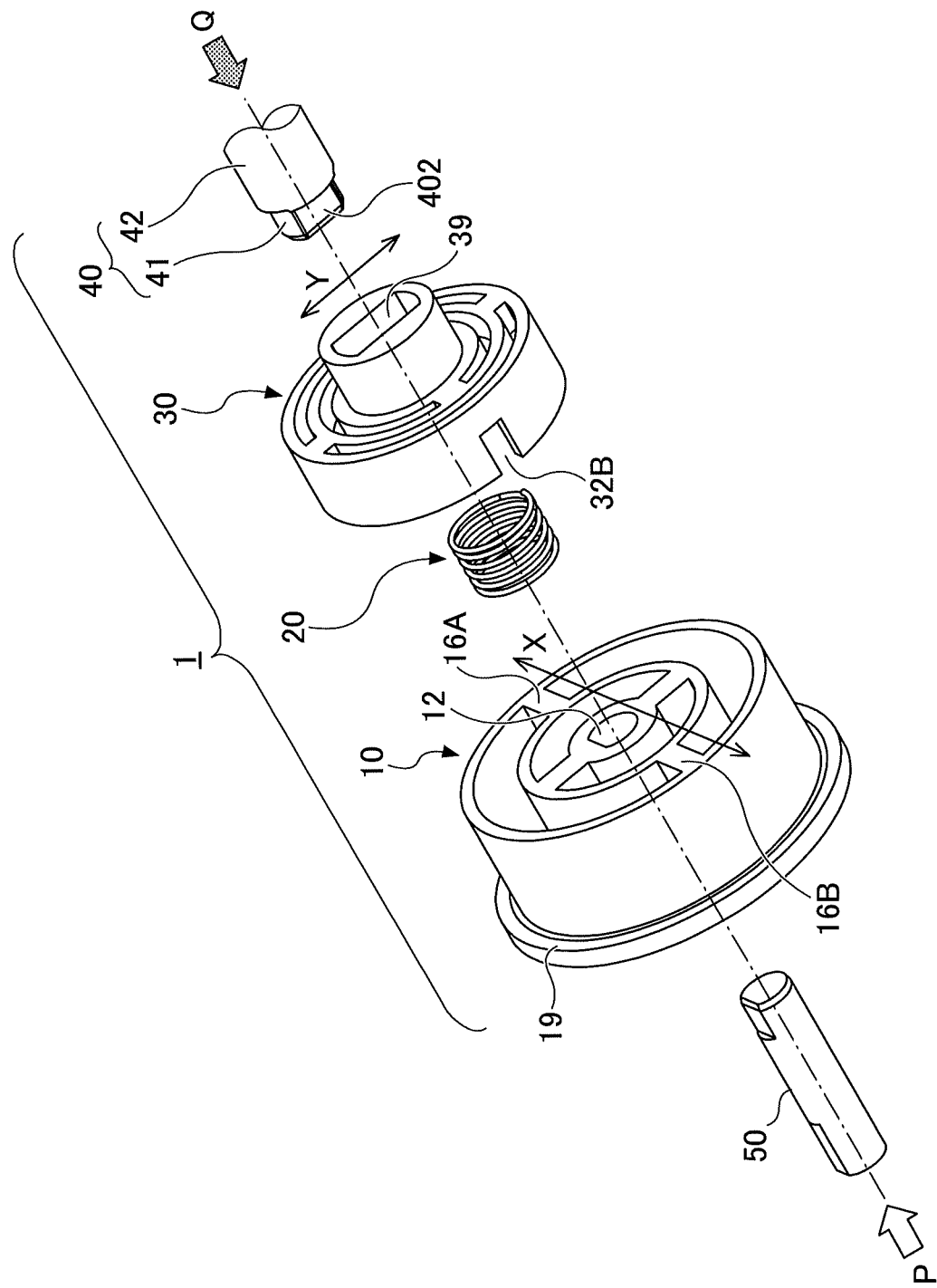

OLDHAM COUPLING

CROSS-REFERENCE TO RELATED APPLICATION

This application is a continuation application of International Application No. PCT/JP2017/035866 filed on Oct. 2, 2017 and designated the U.S., which is based upon and claims the benefit of priority of the prior Japanese Patent Application No. 2017-003654, filed on Jan. 12, 2017, the entire contents of which are incorporated herein by reference.

BACKGROUND OF THE INVENTION

1. Field of the Invention

The embodiments discussed herein relate to an Oldham coupling, that is interposed between 2 rotational shafts having different operating temperatures at connecting ends, and transmits power.

2. Description of the Related Art

From a viewpoint of reducing weight, reducing size, and reducing cost, resin products are increasingly used for an actuator of a vehicle. However, the resin products have a low heat resistant temperature.

In addition, it is known that a joint, that connects the actuator for the vehicle and a valve, is preferably an Oldham coupling structure because the power of the actuator can be efficiently transmitted to the valve even in a state in which a mounting misalignment of centers occurs.

For example, as a measure for the Oldham coupling against high temperatures, Japanese Laid-Open Utility Model Publication No. 2-62730 proposes a configuration in which a plurality of holes are formed in a circular arrangement in peripheries of sliding contact parts of a hub and a relay joint, with respect to risks of frictional heat generation at the sliding contact parts where teeth and grooves repeatedly make sliding contact, in order to dissipate (release) the heat.

However, the configuration proposed in Japanese Laid-Open Utility Model Publication No. 2-62730 dissipates the heat of the joint itself through the holes for cooling, and no measures are taken with respect to an exhaust valve assuming a high temperature at the connecting end.

The temperature of an exhaust gas may rise to a temperature of approximately 600° C. to approximately 1000° C. For this reason, when the exhaust valve is connected to one connecting end of the joint, increasingly used actuators made of resins cannot withstand the high temperature if the temperature of the exhaust valve is transmitted to the actuator at the other connecting end of the joint.

In addition, when the actuator made of the resin is made to withstand the high temperature, another problem is introduced in that the cost becomes high.

Further, when a plurality of conventional Oldham couplings are to be provided in order to improve the heat dissipating effect, it is difficult to set up the Oldham couplings because of a limited layout area within the vehicle, for example.

SUMMARY OF THE INVENTION

Accordingly, it is an object in one aspect of the embodiments to provide an Oldham coupling capable of taking measures against shaft misalignment using a compact configuration, and having a high heat dissipation efficiency between the connecting ends.

According to one aspect of the embodiments, a coupling that transmits a torque between opposing shaft ends of rotational shafts at two connecting destinations having different operating temperatures, by being interposed between the opposing shaft ends, includes first, second, and third members. A first rotational shaft of one of the two destinations is connected to the first member. The second rotational shaft of the other of the two destinations is connected to the third member. A first protruding part, protruding in a coaxial direction parallel to the first rotational shaft and extending in a first direction that is a diametrical direction of the first rotational shaft, may be provided in one of the first member and the second member. The other of the first member and the second member includes a first notch part fitted to the first protruding part and slidable in the first direction along the first protruding part. A second notch part, extending in a second direction that is the diametrical direction of the second rotational shaft and perpendicular to the first direction, may be formed in one of the second member and the third member. The other of the second member and the third member includes a second protruding part fitted to the second notch part and slidable in the second direction along the second notch part. At least one of the first member, the second member, and the third member may have a heat dissipating structure including a plurality of concentric hollow cylinders that have different diameters, are mutually separated, and connected by bridge parts.

Other objects and further features of the present invention will be apparent from the following detailed description when read in conjunction with the accompanying drawings.

BRIEF DESCRIPTION OF THE DRAWINGS

FIG. 3A is a disassembled perspective view of the Oldham coupling in the first embodiment of the present invention;

FIG. 3B is a disassembled perspective view of the Oldham coupling in the first embodiment of the present invention viewed from an angle different from that of FIG. 3A;

DESCRIPTION OF THE PREFERRED EMBODIMENTS

Figure 1:
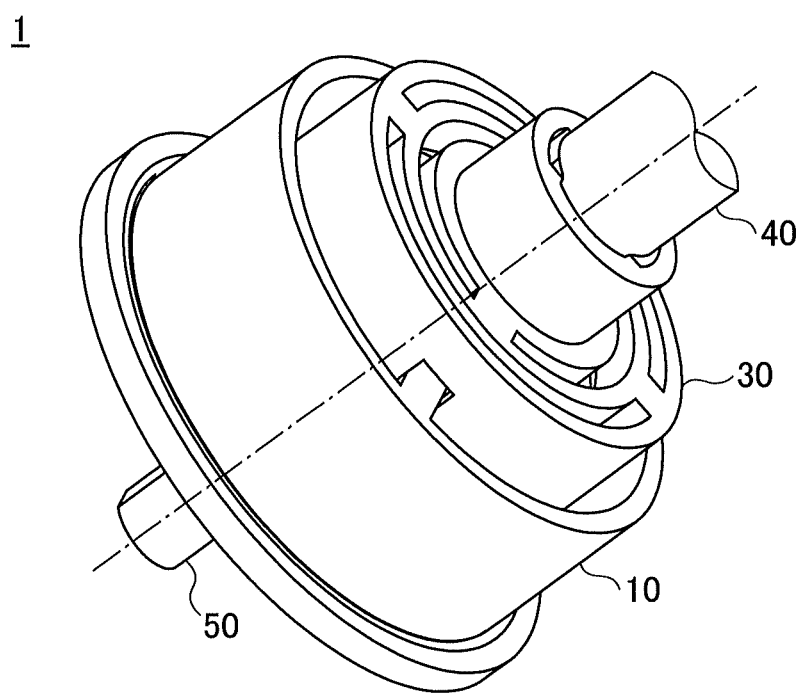
FIG. 1 is a full view of an example of an Oldham coupling in a first embodiment of the present invention.

Embodiments of the present invention will be described by referring to the drawings. In the drawings, those parts that are the same are designated by the same reference numerals, and a repeated description of the same parts may be omitted.

First Embodiment

FIG. 1 is a full view of an example of an Oldham coupling 1 in a first embodiment of the present invention.

The Oldham coupling 1 in one embodiment of the present invention is connected to be able to transmit a torque between opposing shaft ends of rotational shafts at 2 connecting destinations having different operating temperatures. The Oldham coupling 1 includes a first member 10, a second member 30, and a third member 40, as an Oldham mechanism.

Figure 2:
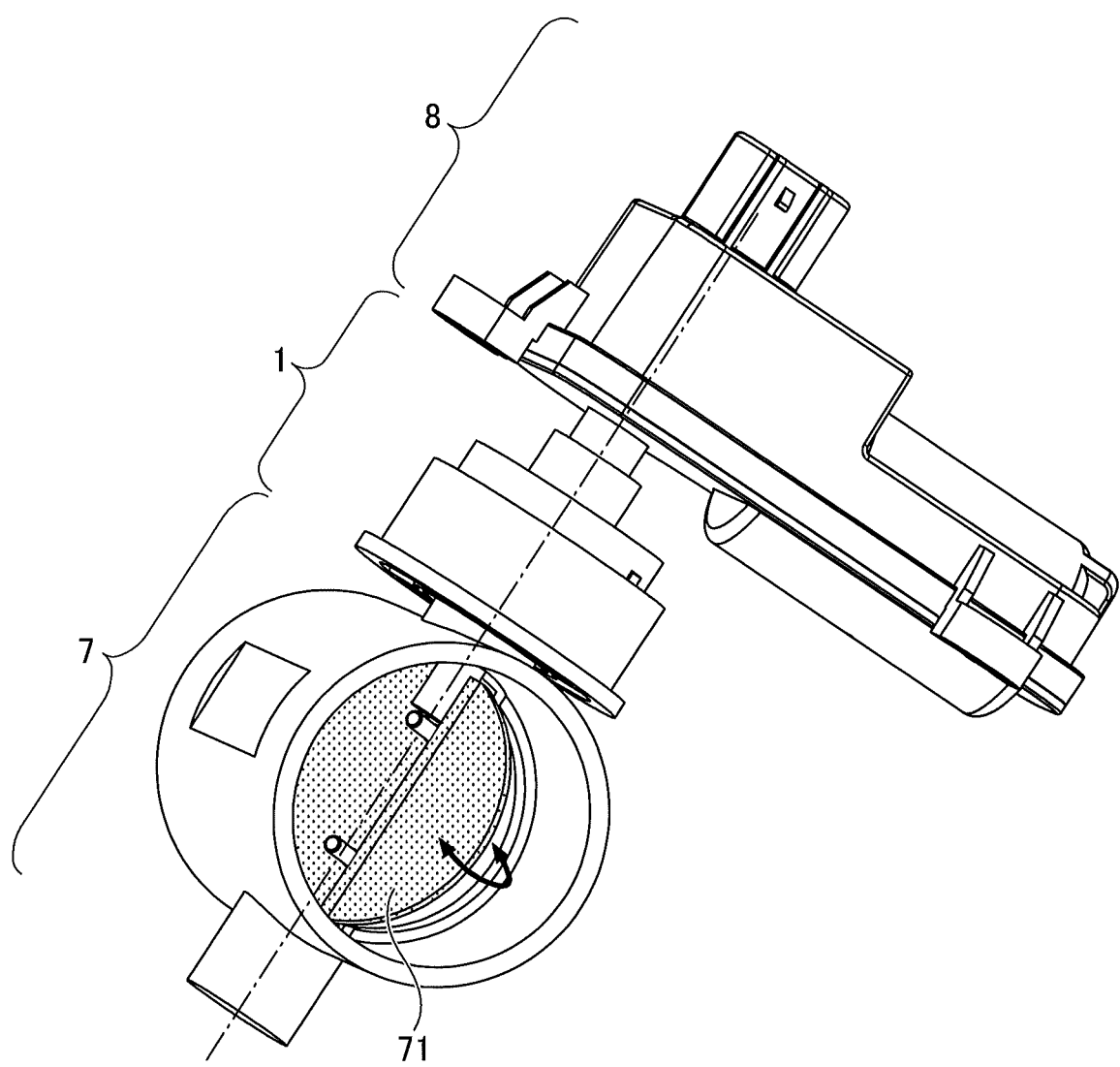
FIG. 2 is a diagram illustrating an example in which the Oldham coupling in the first embodiment of the present invention is connected to an exhaust valve within an exhaust pipe and an actuator.

FIG. 2 is a diagram illustrating an example in which the Oldham coupling 1 in the first embodiment of the present invention is connected between an exhaust valve 71 within an exhaust pipe 7, and an actuator 8.

In the example illustrated in FIG. 2, one connecting destination of the Oldham coupling 1 in this embodiment is the exhaust valve (driven body) 71 provided in the exhaust pipe 7 of an automobile, for example, and the other connecting destination of the Oldham coupling 1 is the actuator (exhaust valve driving device, driving source) 8.

The actuator 8 opens and closes the exhaust valve 71 so as to change an exhaust passage or an amount of an exhaust gas exhausted from an internal combustion engine of the automobile. Because the exhaust gas passing through the exhaust pipe 7 has a high temperature, the exhaust valve 71 that is the driven body opens and closes the exhaust valve 71 by rotating under a high-temperature environment.

A misalignment may be generated in set up positions of the actuator 8 and the exhaust pipe 7. For this reason, when mounting the joint on the vehicle between 2 connecting destinations, it is desirable to cope with a shaft misalignment in order to efficiently transmit the power of the actuator 8 to the exhaust valve 71. Hence, preferably, the Oldham coupling that is applied can tolerate the shaft misalignment.

For example, the exhaust valve (rotary on-off valve) 71 rotates by approximately 90 degrees within the exhaust pipe 7, by being transmitted of a driving force from the actuator 8. In this embodiment, the Oldham coupling 1, that is a joining member (joint), transmits the driving force of a rotational shaft 42 (refer to FIG. 3A) of the actuator 8 that is the driving source, to a rotational shaft 50 (refer to FIG. 1 and FIG. 3A) of the exhaust valve 71, that is the driven body, within the exhaust pipe 7.

From viewpoints of reducing weight, reducing size, and reducing cost, resin products are popularly used for the actuator 8 that is the other connecting destination.

However, the temperature of the exhaust gas passing through the exhaust pipe 7 in which the exhaust valve 71 that is the one connecting destination is provided may reach approximately 600° C. to approximately 1000° C.

Accordingly, the temperature of the rotational shaft 50 of the exhaust valve 71 at a time of exhaustion becomes considerably higher than the operating temperature (for example, operating temperature of 200° C.) of the resin material forming the actuator 8, and it is desirable to reduce heat transfer at the part of the Oldham coupling 1 that is a joining part joining the actuator 8 and the exhaust valve 71.

Hence, the Oldham coupling in one embodiment is configured to enable reduction of the heat transfer within the coupling.

FIG. 3A is a disassembled perspective view of the Oldham coupling 1 in the first embodiment of the present invention. FIG. 3B is a disassembled perspective view of the Oldham coupling 1 viewed from an angle different from that of FIG. 3A.

As illustrated in FIG. 3A, the Oldham coupling 1 includes the first member 10, a spring 20, the second member 30, and the third member 40 between the rotational shaft (valve shaft) 50 of the exhaust valve 71 that is the one connecting destination, and the rotational shaft (output shaft) 42 of the actuator 8 that is the other connecting destination.

In the Oldham coupling 1 in the first embodiment, the first member (first hub) 10 of the Oldham mechanism has a male-type disk structure provided with a protruding part. The second member (relay joint) 30 has a female-type disk structure that caves in from both sides along a rotational axis direction, and is provided with notch parts for making sliding contact formed in different directions. The third member 40 has a male-type structure provided with a protruding part.

In this embodiment, as illustrated in FIG. 3A, the third member 40 is integrally formed on the rotational shaft (output shaft) 42 of a gear 81 with an integral shaft, of the actuator 8.

In addition, as illustrated in FIG. 3A, a large outer coil spring 6 may be provided on an outer periphery of the Oldham coupling 1. In a case in which the outer coil spring 6 is provided, the outer coil spring 6 is arranged between a flange 19 that protrudes from an outer peripheral part of the first member 10, and an actuator mounting member 83 that is mounted in front of casing 82 (refer to FIG. 6D) of the actuator 8 that is the other connecting destination. The outer coil spring 6 is a thrust load spring that reduces a load in an axial direction generated on the exhaust valve 71 due to vibration or the like of the vehicle applied to the actuator shaft (rotational shaft 50) that is the joining member between the shaft ends.

Figure 4:
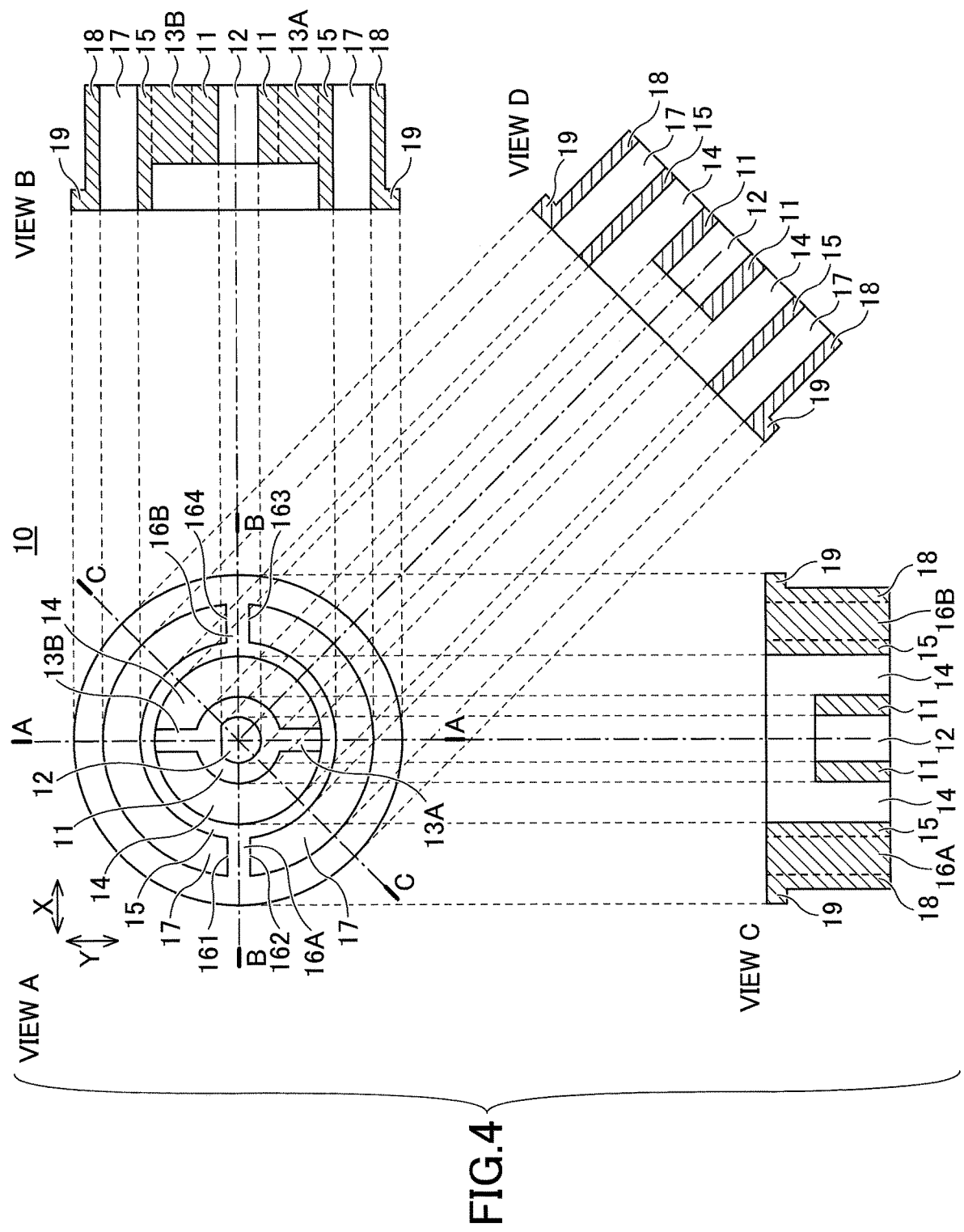
FIG. 4 is a diagram, including views A, B, C, and D, for explaining a first member (first hub) of the Oldham coupling illustrated in FIG. 3A.

As illustrated in FIG. 4, a fitting hole 12 is formed in the first member (shaft joint, first hub) 10 of the Oldham coupling 1, and the rotational shaft 50 of the exhaust valve 71 that is the one connecting destination fits into the fitting hole 12 and is fixed to the first member 10. In addition, in the first member 10, Oldham bridge parts (first protruding parts) 16A and 16B protrude in a direction opposite to an opening direction of the fitting hole 12 in a coaxial direction parallel to the rotational shaft 50. The Oldham bridge parts 16A and 16B extend in a first direction X that is a diametrical direction of the rotational shaft 50.

In FIG. 3A and FIG. 3B, the example of the fitting hole 12 has a D-shape such that 1 location of the circular shape is cut out in a straight line, for a rotational positioning of a D-shaped cutout part at a tip end of the rotational shaft 50 of the exhaust valve 71 when the rotational shaft 50 is inserted (press-fit) into the fitting hole 12. However, the fitting hole 12 may have any shape corresponding to that of the tip end of the rotational shaft 50. For example, the fitting hole 12 may have an I-shape such that 2 locations of the circular shape is cutout in a straight line. Alternatively, the fitting hole 12 may have a circular shape without a positioning cutout.

First notch parts 32A and 32B, to which the Oldham bridge parts (first protruding parts) 16A and 16B respectively fit, are formed in the second member (joint, relay joint) 30. The first notch parts 32A and 32B are slidable in the first direction X along the respective Oldham bridge parts (first protruding parts) 16A and 16B of the first member 10.

A connecting hole (second notch part) 39, that caves in in a direction opposite to the direction in which the first notch parts 32A and 32B cave in, is formed in the second member 30. The connecting hole 39 is elongated in a second direction Y that is perpendicular to the first direction X, that is, elongated in the diametrical direction of the rotational shaft 50. In other words, the connecting hole 39 extends in the second direction Y.

A tip end shaft (second protruding part) 41 is provided on the third member (actuator-end shaft) 40. The tip end shaft (second protruding part) 41 fits into the connecting hole 39 of the second member 30, and connects to the rotational shaft 42 of the actuator 8. As illustrated in FIGS. 3A and 3B, the tip end shaft (second protruding part) 41 has an I-shape including sides 401 and 402 parallel to the second direction Y, and is thus slidable in the second direction Y along the connecting hole (second notch part) 39 of the second member 30.

FIG. 3A and FIG. 3B illustrate an example in which a protruding part (tip end projection) of the tip end shaft 41 has the I-shape. However, the tip end shaft 41 of the third member 40 may have the I-shape or an rectangular shape as long as the tip end shaft 41 includes the sides 401 and 402 parallel to the second direction Y.

At least one of the first member 10, the second member 30, and the third member 40 has a heat dissipating structure including a plurality of concentric hollow cylinders that have different diameters and are mutually separated, and in which the plurality of hollow cylinders are connected by the bridge parts.

This embodiment illustrates an example in which the first member 10 and the second member 30 have the heat dissipating structure. Each of the first member 10 and the second member 30 has the heat dissipating structure including a triple hollow cylinder structure and 2 pairs of bridge structures. Details of the structures of the first member 10 and the second member 30 will be described in conjunction with FIG. 4 and FIG. 5.

<First Member>

FIG. 4 is a diagram for explaining the first member 10 that functions as first hub, and includes views A, B, C, and D. In FIG. 4, the view A of the first member 10 is viewed from a direction of an arrow P in FIG. 3B. In FIG. 4, the view B is a cross sectional view of a plane A-A in the view A of FIG. 4. In FIG. 4, the view C is a cross sectional view of a plane B-B in the view A of FIG. 4. In FIG. 4, the view D is a cross sectional view of a plane C-C in the view A of FIG. 4.

As illustrated in the view A of FIG. 4, the first member 10 is provided with a fixedly connecting hollow cylinder 11, an intermediate diameter hollow cylinder 15, and a large diameter hollow cylinder 18, as concentric hollow cylinders that are approximately cylindrical. The fixedly connecting hollow cylinder 11, located at a central part of the hollow cylinders, includes the fitting hole 12. The rotational shaft 50 of the exhaust valve 71 at the one connecting destination fits into the fitting hole 12.

As illustrated in the views A and B of FIG. 4, the fixedly connecting hollow cylinder 11 located at the central part, and the intermediate diameter hollow cylinder 15 located second (at a second layer) from an inner part, are connected by 2 collinear bridge parts 13A and 13B that are separated from each other. In this example, the hollow cylinders are connected by the 2 bridge parts 13A and 13B, however, 1 bridge part may connect the adjacent hollow cylinders not used for an Oldham interfitting (slidable joining) with the second member 30.

As illustrated in the views A and C of FIG. 4, the intermediate diameter hollow cylinder 15 located second from the inner part and second from an outer part, and the large diameter hollow cylinder 18 located at an outermost part, are connected by the 2 collinear bridge parts 16A and 16B that are separated from each other. The Oldham bridge part 16A includes edge parts 161 an 162 that are parallel to the first direction X, and the Oldham bridge part 16B includes edge parts 163 and 164 that are parallel to the first direction X. The Oldham bridge parts 16A and 16B function as the first protruding parts.

As illustrated in the views A and D of FIG. 4, inner approximately annular hollow parts 14 and 14, and outer approximately annular parts 17 and 17, are formed between the plurality of hollow cylinders of the first member 10, at parts where the bridge parts 13A, 13B, 16A, and 16B are not provided. More particularly, the inner approximately annular hollow part 14 is formed between the fixedly connecting hollow cylinder 11 that is located at the central part of the cylinders, and the intermediate diameter hollow cylinder 15 that is located at an intermediate part between the cylinder at the inner part and the cylinder at the outer part. The outer approximately annular part 17 is formed between the intermediate diameter hollow cylinder 15 and the large diameter hollow cylinder 18.

<Second Member>

Figure 5:
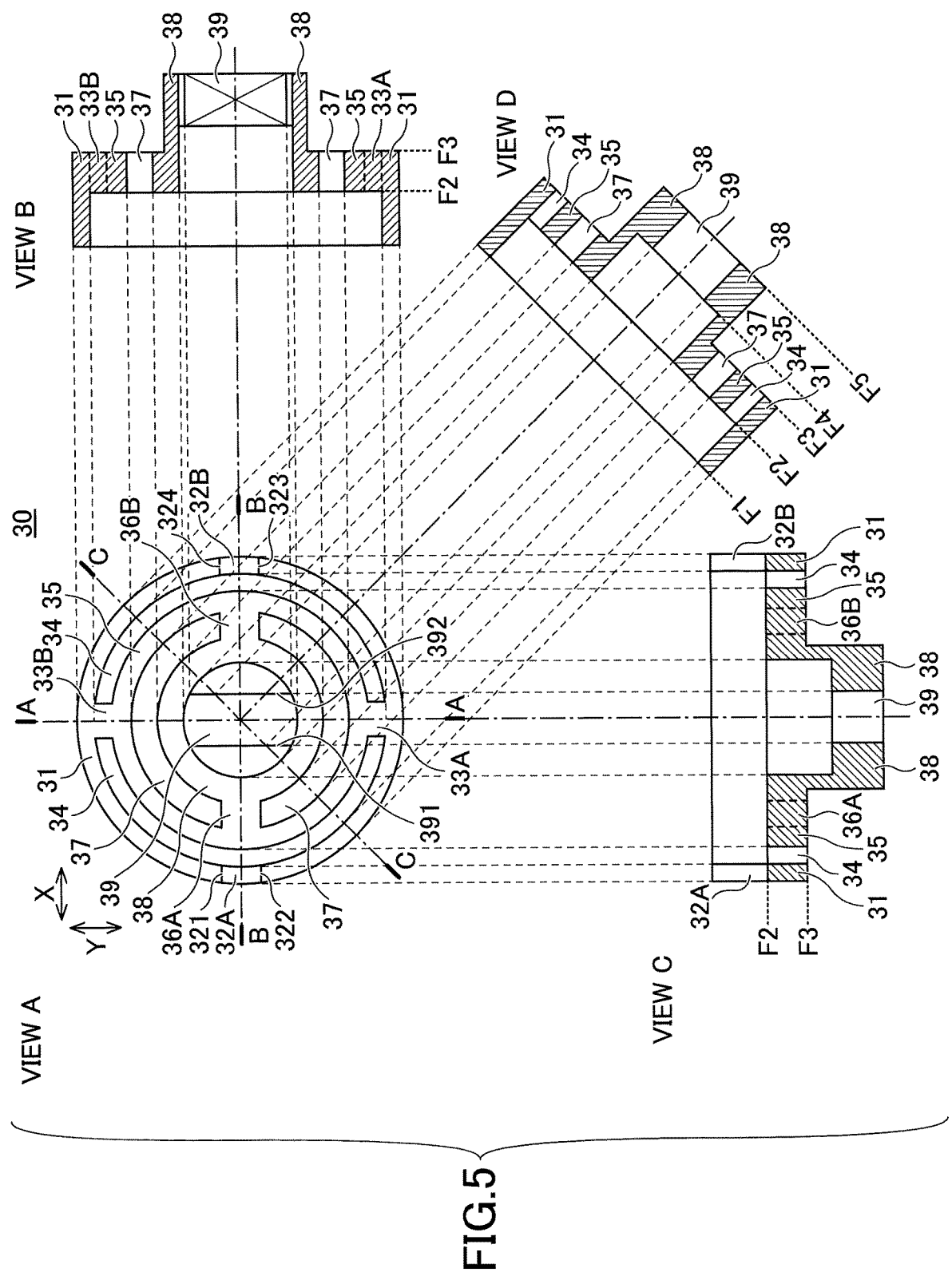
FIG. 5 is a diagram, including views A, B, C, and D, for explaining a second member (relay joint) of the Oldham coupling illustrated in FIG. 3A.

FIG. 5 is a diagram for explaining the second member 40 that functions as the relay joint, and includes views A, B, C, and D. In FIG. 5, the view A of the second member 40 is viewed from a direction of an arrow Q in FIG. 3B. In FIG. 5, the view B is a cross sectional view of a plane A-A in the view A of FIG. 5. In FIG. 5, the view C is a cross sectional view of a plane B-B in the view A of FIG. 5. In FIG. 5, the view D is a cross sectional view of a plane C-C in the view A of FIG. 5.

As illustrated in the view A of FIG. 5, the second member 30 also has a triple hollow cylinder structure, similar to that of the first member 10, and is provided with 2 pairs of bridge parts connecting the hollow cylinders to each other in different directions. That is, the second member 30 is provided with an outermost hollow cylinder 31, an intermediate diameter hollow cylinder 35, and a slidably connecting hollow cylinder 38, as concentric hollow cylinders that are approximately cylindrical.

The connecting hole (second notch part) 39 is a penetration hole formed in the slidably connecting hollow cylinder 38 located at a central part, to enable the tip end shaft 41 of the third member 40 to slidably connect into the connecting hole 39. This connecting hole 39 has an I-shape, for example, and is formed by notch sidewalls 391 and 392 parallel to the second direction Y.

As illustrated in the views A and B of FIG. 5, the intermediate diameter hollow cylinder 35 located second from an outer part, and the outermost hollow cylinder 31 located at an outermost part, are connected by 2 collinear bridge parts 33A and 33B that are separated from each other and extend along the second direction Y.

As illustrated in the views A and C in FIG. 5, the slidably connecting cylinder 38 located at the central part, and the intermediate diameter cylinder 35 located second from the outer part and second from the inner part, are connected by 2 collinear bridge parts 36A and 36B that are separated from each other.

In this example, the 2 pairs of bridge parts (33A and 33B) and (36A and 36B) are respectively formed by 2 bridge parts. However, however, 1 bridge part may connect the adjacent hollow cylinders of the second member 30, not used for the Oldham interfitting.

As illustrated in the views A through C of FIG. 5, the collinear first notch parts 32A and 32B that are separated from each other and extend in the first direction X, are formed in the outermost hollow cylinder 31. The first notch part 32A includes notch sidewalls 321 and 322 parallel to the first direction X, and the first notch part 32B includes notch sidewalls 323 and 324 parallel to the first direction X.

As illustrated in the views A and D of FIG. 5, outer approximately annular hollow parts 34 and 34, and inner approximately annular parts 37 and 37, are formed between the plurality of hollow cylinders of the second member 30, at parts where the bridge parts 33A, 33B, 36A, and 36B are not provided. More particularly, the inner approximately annular hollow part 37 is formed between the slidably connecting hollow cylinder 38 that is located at the central part and forms a bearing part, and the intermediate diameter hollow cylinder 35 that is located at an intermediate part between cylinder at the inner part and the cylinder at the outer part. The outer approximately annular part 34 is formed between the intermediate diameter hollow cylinder 35 and the outermost hollow cylinder 31.

In addition, as illustrated in the views B through D of FIG. 5, an end face F1 of the outermost hollow cylinder 31, facing the first member 10, is configured to protrude (extend) closer toward the first member 10 than end faces F4 and F2 of the hollow cylinders 38 and 35 located at the inner side and facing the first member 10, and the end faces F2 of the bridge parts 33A, 33B, 36A, and 36B facing the first member 10. According to this configuration, after assembling such that the first notch parts 32A and 32B of the second member 30 stride over the Oldham bridge parts 16A and 16B that form the outermost bridge parts of the first member 10, constituent elements (33A, 33B, 35, 36A, 36B, and 38) located at the inner part are prevented from interfering with the sliding of the outermost hollow cylinder 31 in the first direction X along the Oldham bridge parts 16A and 16B.

In addition, as illustrated in the views B through D of FIG. 5, a part (protruding end face) F5 of an end face (end face forming the connecting hole 39) of the slidably connecting hollow cylinder 38, facing the third member 40, surrounding at least the second notch part (connection hole 39), is configured to protrude closer toward the third member 40 than end faces F3 of the hollow cylinders 35 and 31 located at the outer part facing the third member 40 and the bridge parts 36A, 36B, 33A, and 33B facing the third member 40. A part (concave end face) F4 of the end face on the inner part of the protruding end face F5, facing the first member 10, is configured to (be short and) cave in further away from the first member 10 than the end faces F2 and F1 of the hollow cylinders 35 and 31 located at the outer part facing the first member 10 and the bridge parts 36A, 36B, 33A, and 33B facing the first member 10. The spring 20 is arranged in the caved-in part of the part F4, as illustrated in FIG. 6A through FIG. 6D.

<Overall View>

Figure 6A:
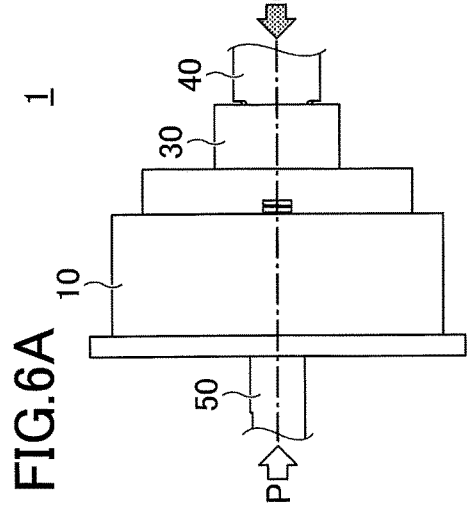
FIG. 6A, FIG. 6B, FIG. 6C, and FIG. 6D are diagrams for explaining the Oldham coupling in the first embodiment of the present invention.
Figure 6B:
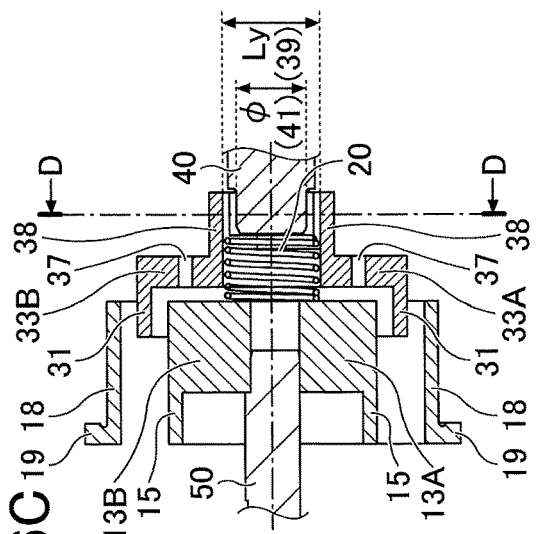
Figure 6C:
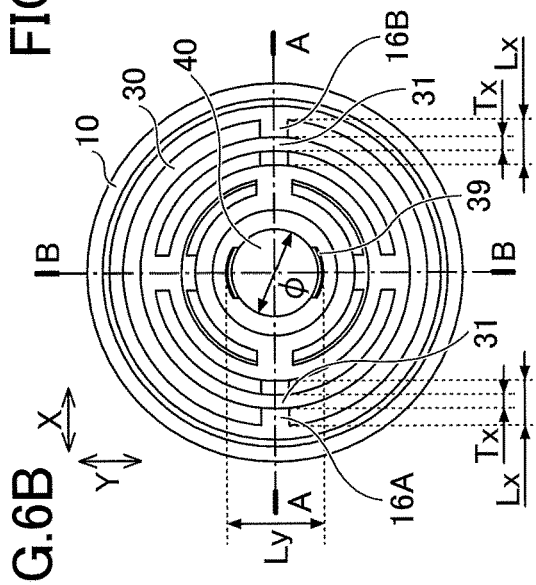
Figure 6D:
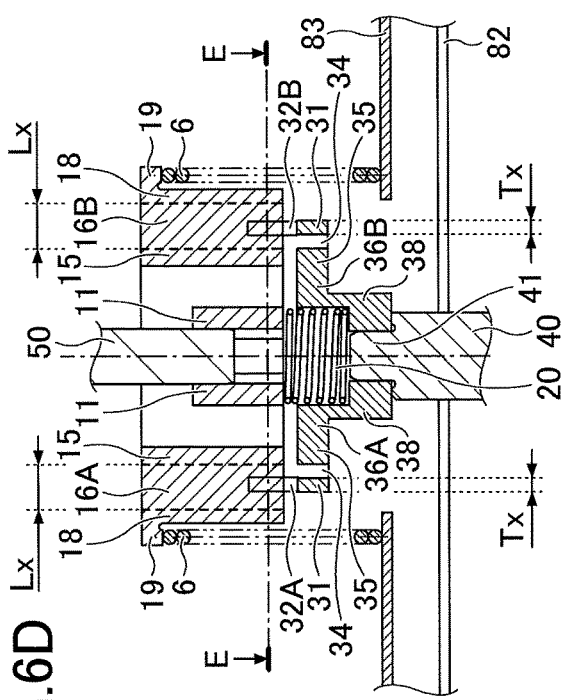

FIG. 6A through FIG. 6D are diagrams for explaining the Oldham coupling 1 in the first embodiment of the present invention. FIG. 6A is a transverse sectional view of the Oldham coupling 1, and FIG. 6B is a view the Oldham coupling 1 viewed from a direction of an arrow Q in FIG. 6A. FIG. 6C is a cross sectional view of a plane B-B in FIG. 6B, FIG. 6D is a cross sectional view of a plane A-A in FIG. 6B.

As illustrated in the view A of FIG. 5 and FIG. 6B, the connecting hole 39 in the second member 30, forming the second notch part, has the I-shape or a rectangular shape formed by the notch sidewalls 391 and 392 parallel to the second direction Y.

As illustrated in FIG. 3A described above, the third member 40 includes the tip end shaft 41 having the I-shape or the rectangular shape including the sides 401 and 402 parallel to the second direction Y. As illustrated in FIG. 6B and FIG. 6C), because a size (diameter $\phi$) of the tip end shaft 41 is smaller than a size (length Ly in the second direction Y) of the connecting hole 39 of the second member 30, the tip end shaft 41 is slidable in the second direction Y (up and down directions in FIG. 6B and FIG. 6C).

As an example, when the diameter $\phi$ of the tip end shaft 41 is set to 7.8 mm, the length Ly of the elongated connecting hole 39 in the second direction Y is set to approximately 10 mm. Ly-$\phi$ need only be set greater than or equal to an amount of required shaft misalignment.

In addition, as illustrated in FIG. 6D, a thickness (radial thickness, width) Tx of the outermost hollow cylinder 31 located at the outmost part of the second member 30, where the first notch parts 32A and 32B are formed, is smaller than a length of a spacing Lx between the large diameter hollow cylinder 18 located at the outmost part of the first member 10 and the intermediate diameter hollow cylinder 15 located second from the outer part. That is, in the assembled state, with respect to the thickness Tx of the outermost hollow cylinder 31 where the first notch parts 32A and 32B are formed, the length (=spacing between the adjacent cylinders) Lx of the Oldham bridge parts 16A and 16B includes a play in the first direction X.

Further, as described in conjunction with the view D of FIG. 5, the end face F1 of the outermost hollow cylinder 31 of the second member 30, facing the first member 10, protrudes closer toward the first member 10 than the end faces F2 and F4 of the hollow cylinders 35 and 38 located at the inner side and facing the first member 10, and the end faces F2 of the bridge parts 33A, 33B, 36A, and 36B facing the first member 10.

For this reason, the notch sidewalls 321, 322, 323, and 324 of the first notch parts 32A and 32B in the outermost hollow cylinder 31 of the second member 30, are slidable in the first direction X (left and right directions in FIG. 6B and FIG. 6C) along the edge parts 161, 162, 163, and 164 of the Oldham bridge parts 16A and 16B located at the outermost part of the first member 10, without being affected by the constituent elements located at the inner part.

As an example, when the thickness Tx of the outermost hollow cylinder 31 is set to approximately 2 mm, the length (distance between the adjacent hollow cylinders) Lx of the Oldham bridge parts 15A and 16B including the play, is set to approximately 6 mm in the first direction X. Within these settings, Lx-Tx need only be set greater than or equal to the amount of required shaft misalignment.

In addition, as illustrated in FIG. 6C, the spring 20 is provided between the first member 10 and the second member 30. More particularly, as described in conjunction with the view D of FIG. 5, the concave end face F4 on the inner part of the protruding end face F5, facing the first member 10, is configured to cave in further away from the first member 10 than the end faces F2 and F1 of the hollow cylinders 35 and 31 located at the outer part facing the first member 10 and the bridge parts 36A, 36B, 33A, and 33B facing the first member 10. The spring 20 is arranged between the caved-in part of the slidably connecting hollow cylinder 38 of the second member 30, and the fixedly connecting hollow cylinder 11 of the first member 10.

Further, as illustrated in FIG. 6D, the Oldham coupling 1 is assembled by pressing the spring 20 from both sides of the shaft ends of the rotational shafts 50 and 42 (refer to FIG. 3A), in a state in which the first notch parts 32A and 32B of the second member 30 stride over the Oldham bridge parts 16A and 16B that also function as the first protruding parts. That is, in the state in which the Oldham coupling 1 is interposed between the 2 connecting destinations 7 and 8, the spring 20 is in a compressed state.

By providing the spring 20 in this manner, the spring 20 in the assembled state exerts an outward elastic force. Hence, it is possible to absorb a sliding play between the first member 10 and the second member 30, and between the second member 30 and the third member 40, caused by approaching and separating positions of the rotary shafts 50 and 42 of the 2 connecting destinations 7 and 8.

The spring 20 has a play absorbing function to improve durability of the first member 10 and the second member 30 when the first member 10 and the second member 30 make a sliding movement.

As described above, the Oldham coupling 1 in this embodiment, as the Oldham mechanism, tolerates a misalignment in the first direction X between the first member 10 and the second member 30, and tolerates a misalignment in the second direction Y between the second member 30 and the third member 40. For this reason, smooth rotation is possible without interference, even when centers of the rotary shafts 50 and 42 are misaligned.

Further, a play in the second member 30 forming the relay joint can be reduced, because the spring 20 is provided between the first member 10 and the second member 30. Heat is uneasily transmitted to the spring 20 because the spring 20 has a long wiring length and a small cross sectional area. Hence, the temperature in the Oldham mechanism becomes less than or approximately equal to the temperature after the heat is dissipated to the second member 30 from the first member 10 that surrounds the spring 20.

According to the configuration described above, it is possible to tolerate the center misalignment (misalignment in the shaft diametrical direction) between the rotational shaft 50 of the one connecting destination (exhaust valve 71) and the rotational shaft 42 of the other connecting destination (actuator 8), and tolerate the play in the axial direction while reducing the play in the axial direction.

<Heat Dissipation Path>

Figure 7A:
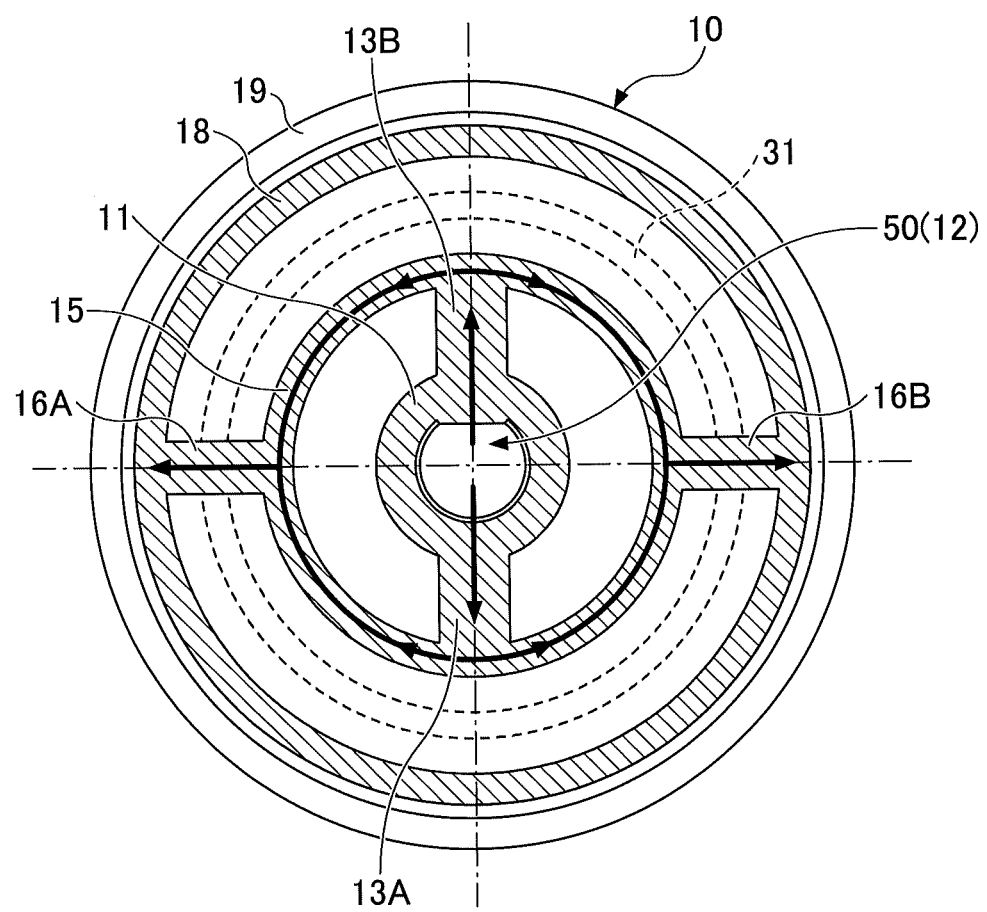
FIG. 7A is a diagram for explaining a heat dissipation path at the first member in the first embodiment of the present invention.
Figure 7B:
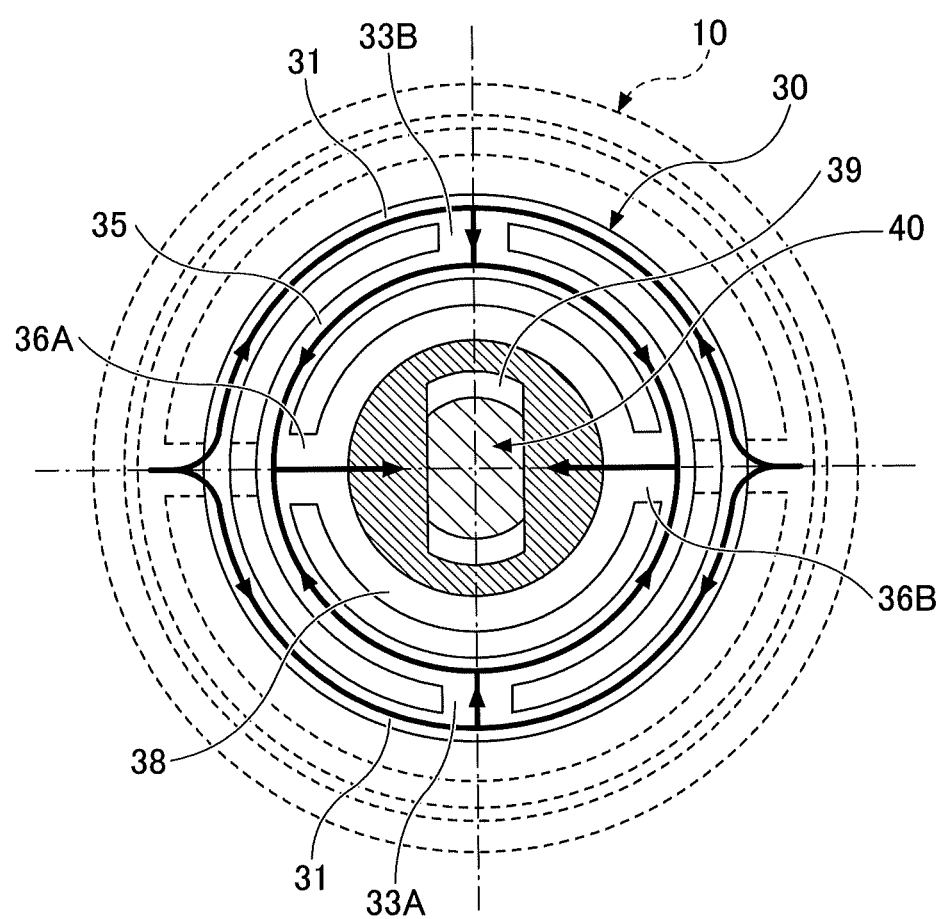
FIG. 7B is a diagram for explaining a heat dissipation path at the second member in the first embodiment of the present invention.

FIG. 7A and FIG. 7B are diagrams for explaining heat dissipation paths (heat transmission paths) of heat dissipating structures of the first member 10 and the second member 30. FIG. 7A is a cross sectional view of a plane E-E in FIG. 6D viewed from the direction of the arrow P in FIG. 6A, and illustrates the heat dissipation path at the first member 10. FIG. 7B is a cross sectional view of a plan D-D in FIG. 6C viewed from the direction of the arrow Q in FIG. 6A, and illustrates the heat dissipation path at the second member 30.

In FIG. 7A and FIG. 7B, members on the front side are indicated by a solid line, and members on the depth side are indicated by a dotted line.

In FIG. 7A and FIG. 7B, the rotational shaft 50 of the exhaust valve 71, that connects to the first member 10, is the heat source and forms the high-temperature end. The rotational shaft 42 of the actuator 8, that is integrally formed on the third member 40, is unsuited for the high-temperature environment and forms the low-temperature end. The heat transfer from the high-temperature end to the low-temperature end is indicated by arrows.

As illustrated in FIG. 7A, a start point of the high-temperature heat transfer in the first member 10 is the fitting hole 12 to which the rotary shaft 50 is connected.

The heat transmitted from the fitting hole 12 passes through the fixedly connecting hollow cylinder 11 located at the central part of the hollow cylinders, and thereafter passes through the 2 bridge parts 13A and 13B, to be transmitted to the medium diameter hollow cylinder 15. The heat then passes through ¼ the circumference of the medium diameter hollow cylinder 15, to be transmitted to the Oldham bridge parts 16A and 16B that are the bridge parts located at the outermost part and also functioning as the first protruding parts. That is, the heat is transmitted from the central part toward the outer part of the hollow cylinders while taking detours.

In the first member 10, the 1 or 2 bridge parts 13A and 13B connecting the medium diameter hollow cylinder 15 and the hollow cylinder (fixedly connecting hollow cylinder) 11 located at the inner part, and the 2 Oldham bridge parts 16A and 16B connecting the medium diameter hollow cylinder 15 and the large diameter hollow cylinder 18 located at the outer part, are arranged with an angular difference of 90°. In this example, 2 pairs of 2 bridge parts are used, with the angular difference of 90° which makes the heat dissipation path the longest. However, the bridge parts (pairs) that connect different hollow cylinders need only be arranged with a non-zero angular difference.

If the adjacent bridge parts 13A and 16A or the adjacent bridge parts 13B and 16B were provided collinearly, the hollow cylinders would not be used for the heat dissipation, and the length of the heat dissipation path would not become long. On the other hand, when the bridge parts are arranged with the angular difference (for example, 90°) as illustrated in FIG. 7A, the heat is always transmitted through at least a part of the hollow cylinders, without providing a short dissipation path in the heat dissipating structure for connecting the hollow cylinders by the bridge parts, to make the heat transfer distance long.

In addition, by employing the above described shape to connect the hollow cylinders, it also becomes possible to increase the surface area in a height direction (axial direction). By making the heat dissipation path long and increasing the heat transfer distance, it becomes possible to improve the heat dissipation performance within the first member 10, and to reduce the heat transfer to the second member 30 as much as possible.

As illustrated in FIG. 7B, a start point of the heat transfer in the second member 30 is the first notch parts 32A and 32B in the outermost hollow cylinder 31 of the second member 30, that stride over and slidably contact the Oldham bridge parts 16A and 16B of the first member 10.

The heat transferred from the first member 10 to the second member 30 passes through ¼ the circumference of the outermost hollow cylinder 31, and is transmitted to the bridge parts 33A and 33B. The heat then passes through the intermediate diameter hollow cylinder 35 located second from the outer part, and is transmitted to the bridge parts 36A and 36B, to be transmitted to the slidably connecting hollow cylinder 38. That is, the heat is transmitted from the outer part toward the central part of the hollow cylinders while taking detours.

In the second member 30, the 1 or 2 bridge parts 36A and 36B connecting the medium diameter hollow cylinder 35 and the hollow cylinder (slidably connecting hollow cylinder) 38 located at the inner part, and the 1 or 2 bridge parts 33A and 33B connecting the medium diameter hollow cylinder 35 and the outermost hollow cylinder 31, are arranged with an angular difference of 90°.

If the adjacent bridge parts 33A and 36A or the adjacent bridge parts 33B and 36B were provided collinearly, the hollow cylinders would not be used for the heat dissipation, and the length of the heat dissipation path would not become long. On the other hand, when the bridge parts are arranged with the angular difference 90° as illustrated in FIG. 7B, the heat is always transmitted through at least a part of the hollow cylinders, without providing a short dissipation path in the heat dissipating structure for connecting the hollow cylinders by the bridge parts, to make the heat transfer distance long.

In addition, by employing the above described shape to connect the hollow cylinders, it also becomes possible to increase the surface area in the height direction (axial direction). By making the heat dissipation path long and increasing the heat transfer distance, it becomes possible to improve the heat dissipation performance within the second member 30, and to reduce the heat transfer to the third member 40 as much as possible.

Accordingly, in this embodiment, both the first member 10 and the second member 30 have the heat dissipating structure in which hollow cylinders are provided in 2 or more stages, and the adjacent hollow cylinders are connected by 1 or 2 bridge parts. In addition, in the first member 10 and the second member 30, the 1 or 2 bridge parts connecting an arbitrary hollow cylinder and the hollow cylinder located at the inner part, and the 1 or 2 bridge parts connecting the arbitrary hollow cylinder and the hollow cylinder located at the outer part, are arranged with the angular difference 90°, so that the length of the heat dissipation path can further be increased.

In the first member 10 and the second member 30, when 1 bridge part connects the arbitrary hollow cylinder and the hollow cylinder located at the inner part, and 1 bridge part connects the arbitrary hollow cylinder and the hollow cylinder located at the outer part, the positions of the bridge parts may be arranged with an angular difference 180°, so that the length of the heat dissipation path can further be increased are arranged with the angular difference 90°, so that the length of the heat dissipation path can further be increased are arranged with the angular difference 90°, so that the length of the heat dissipation path can further be increased by this arrangement.

In the heat dissipating structure described above, it is possible to reduce, as much as possible, the heat transfer between the 2 connecting destinations 7 and 8, in the Oldham coupling 1 that is a joining member. Hence, when the driving force is transmitted from the driving source to the driven body, the heat transfer from the driven body to the driving source through the heat dissipation path can be reduced by taking detours in the hollow cylinders and the bridge parts, while tolerating the sliding movement of the shafts by the Oldham mechanism.

Accordingly, even when the temperature of the exhaust pipe 7 in which the exhaust valve 71 that is the one connecting destination is provided becomes high, the Oldham coupling 1 having the configuration described above insulates the heat before being transmitted to the third member 40. The rotational shaft 42 of the actuator 8 can thus be reduced to less than the heat resistant temperature of the resin.

The temperature before and after the heat dissipation in the joining part using the Oldham coupling 1 in the first embodiment were simulated by a simulation. In the Oldham coupling 1 used for this simulation, the diameter of the flange 19 of the large diameter hollow cylinder 18 of the first member 10 is 54.4 mm, and the length (distance) between the rotational shafts 50 and 42 is 29.7 mm.

For the simulation, the exhaust valve 71 of the exhaust pipe 7, and the actuator 8 are connected by the Oldham coupling 1 having the dimensions described above, as illustrated in FIG. 2. On the other hand, when the temperature of the gas, passing through the exhaust pipe 7 in which the exhaust valve 71 that is the one connecting destination is provided, is set to 625° C., and after the heat is dissipated by the Oldham coupling 1, the temperature of the gear 81 with the integral shaft, of the actuator 8 that is the other connecting destination decreased to 170° C.

Accordingly, by employing the configuration in which the multiple hollow cylinders are connected by the bridge parts, it is possible to increase the surface area without increasing the external size of the Oldham coupling, compared to the general Oldham coupling that is formed by a cylinder having a similar external size. Consequently, for the same space occupied, the Oldham coupling in this embodiment can maximize the heat dissipation.

The rotation for opening or closing the exhaust pipe 71, that is an example of the connecting destination of the Oldham coupling 1 in this embodiment, is approximately 90°. A rate of opening or closing the exhaust valve 71 is limited to the time when opening or closing the exhaust valve 71, and thus, there is no continuous rotation. Hence, it is unnecessary to take into consideration the heat generated due to friction between the sliding contact parts of the Oldham mechanism.

Accordingly, unlike the configuration proposed in Japanese Laid-Open Patent Publication No. 2-62730 in which a plurality of holes are formed in the periphery of the joint itself as a measure against the heat generation, this embodiment can reduce the heat transfer between the connecting destinations by connecting the hollow cylinders to each other, to make the heat transmission path from the one connecting destination to the other connecting destination long, not as a measure against the heat generated due to the friction between the sliding contact parts within the joint.

Hence, it is possible to further reduce the heat transfer from the exhaust valve 7 that is the driven body to the actuator 8 that is the driving source, and improve the heat insulation efficiency.

In this embodiment, the number of hollow cylinders is 3, and 2 bridge parts are provided in each section. However, in a case in which there is a greater demand to dissipate heat so as to further reduce the temperature, the number, of hollow cylinders may be increased (for example, to 3 or more stages of hollow cylinders), or the height (length) of the hollow cylinders may be increased.

In order to increase the surface area, it is preferable to reduce, as much as possible, the thickness of the hollow cylinders and the spacing between the hollow cylinders. However, in order to satisfy restrictions during manufacturing processes or achieve a sufficient strength, the dimensions of the hollow cylinders may be set to satisfy required manufacturing processes or a required strength during use.

In addition, the first member, the second member, and the third member of the Oldham coupling 1 described above may be made of a metal material, such as the SUS-series stainless steel or the like. These members of the Oldham coupling 1 may be manufactured by pressing (punching), or by casing according to sintering that bonds a large amount of metal particles under pressure at a high heating temperature.

In the Oldham coupling 1 in this first embodiment, the third member 40 is integrally formed on the rotational shaft 42 of the actuator 8 that is the other connecting destination. However, the third member 40 may also be provided with a heat dissipating structure, as illustrated below as a modification of the first embodiment.

Modification of First Embodiment

Figure 8A:
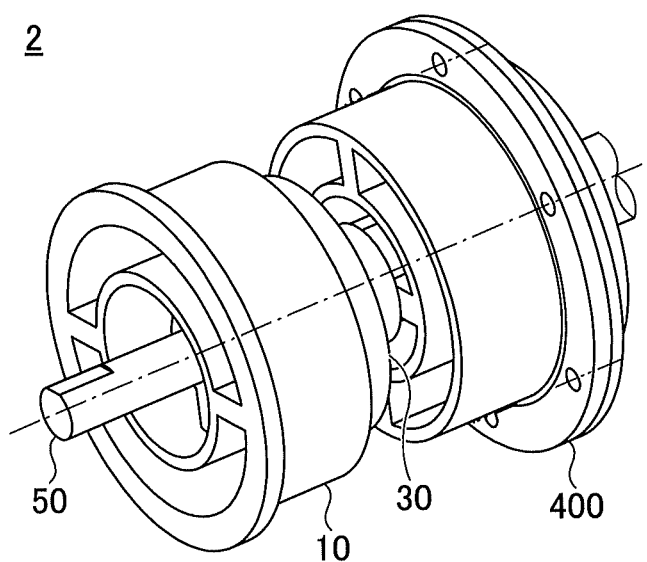
FIG. 8A is a full view of an example of the Oldham coupling in a modification of the first embodiment of the present invention.
Figure 8B:
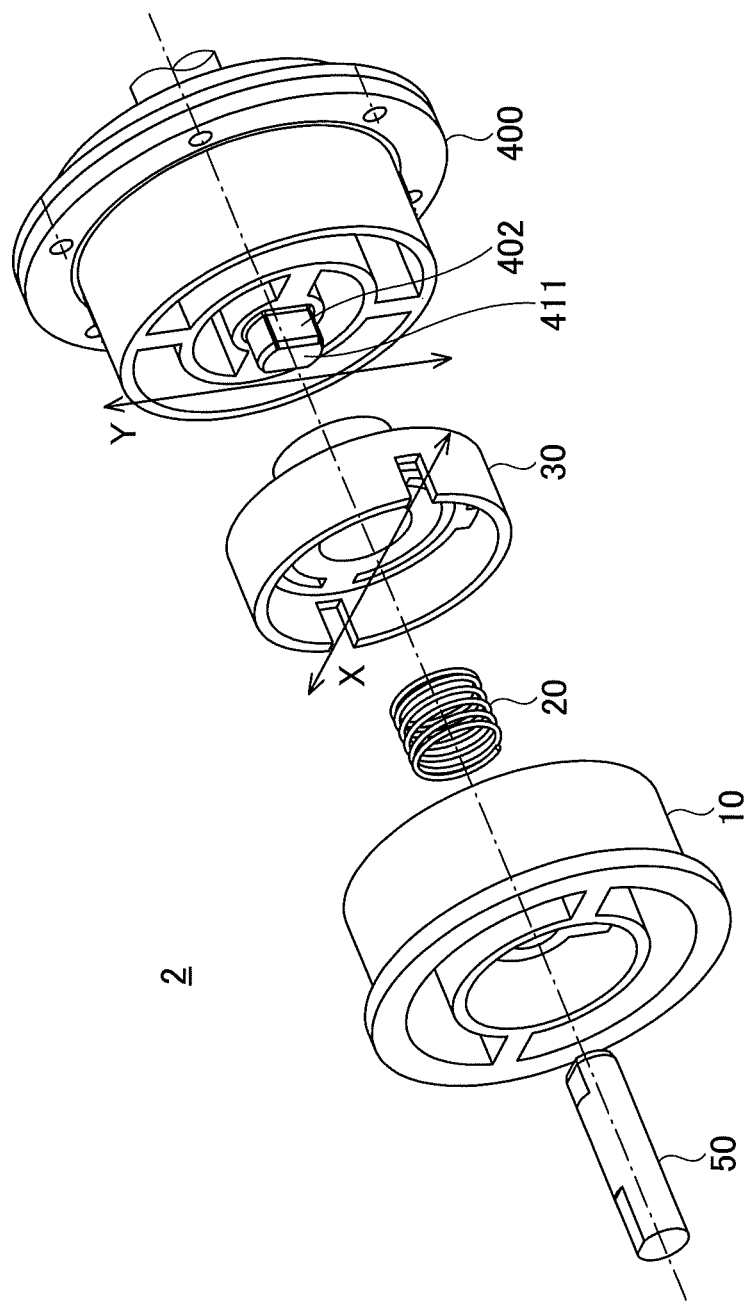
FIG. 8B is a disassembled perspective view of the Oldham coupling in the modification of the first embodiment of the present invention.

The Oldham coupling in the modification of the first embodiment of the present invention will be described, by referring to FIG. 8A through FIG. 9C. FIG. 8A and FIG. 8B are diagrams for explaining an Oldham coupling 2 in the modification of the first embodiment of the present invention. FIG. 8A is a full view of an example of the Oldham coupling 2 in the modification of the first embodiment of the present invention. FIG. 8B is a disassembled perspective view of the Oldham coupling 2.

Figure 9A:
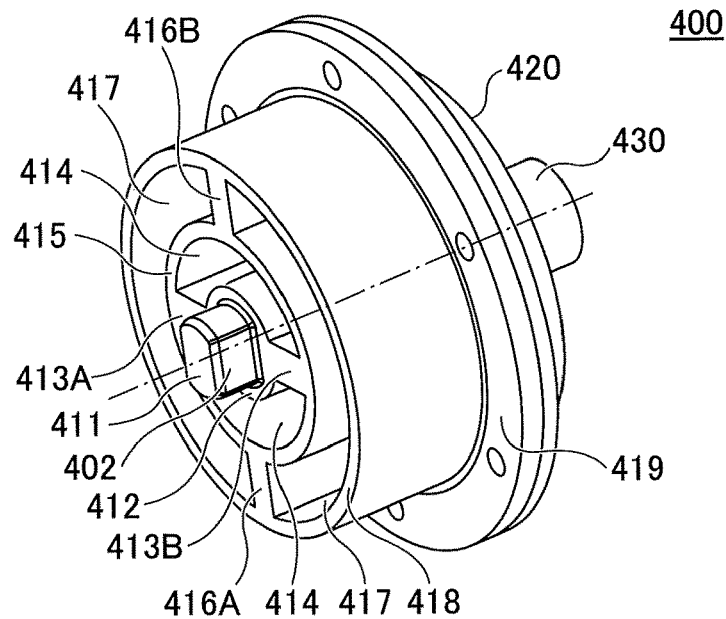
FIG. 9A is a full perspective view of a third member included in the Oldham coupling illustrated in FIG. 8A.
Figure 9B:
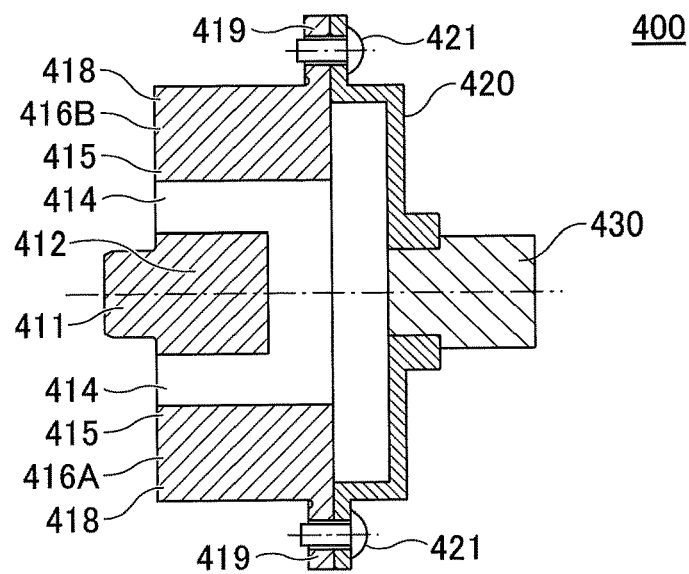
FIG. 9B is a transverse sectional view of the third member illustrated in FIG. 9A.
Figure 9C:
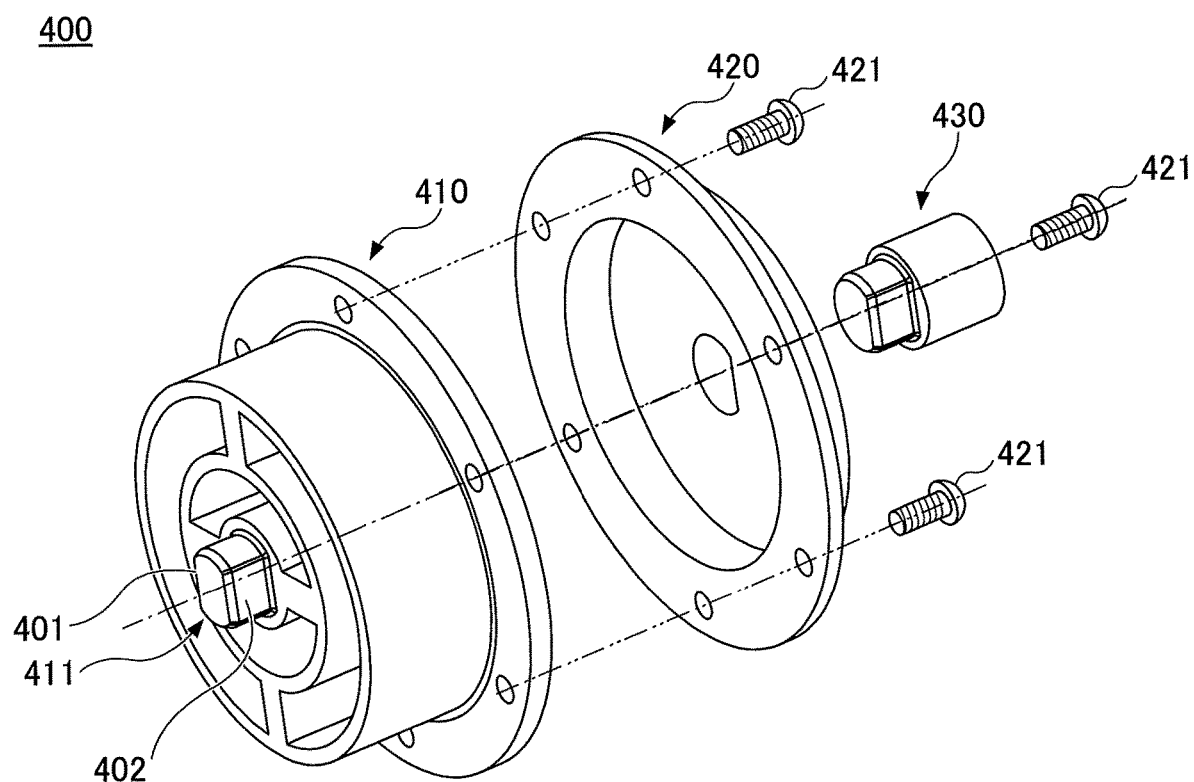
FIG. 9C is a disassembled perspective view of the third member illustrated in FIG. 9A.

FIG. 9A through FIG. 9C are diagrams for explaining a third member 400 included in the Oldham coupling 2 in the modification of the first embodiment. FIG. 9A is a full perspective view of the third member 400, FIG. 9B is a transverse sectional view of the third member 400, and FIG. 9C is a disassembled perspective view of the third member 400.

In this modification, the third member 400 includes a heat dissipating mechanism 410 that is provided with an I-shaped or rectangular shaped tip end shaft 411 having sides 401 and 402 parallel to the second direction Y. In this configuration, the third member 400 also functions as a second hub of the Oldham mechanism.

Further, as illustrated in FIG. 8A through FIG. 9C, in the heat dissipating mechanism 410 of the third member 400 in this embodiment, 2 or more stages of hollow cylinders are provided as the heat dissipating structure, and the hollow cylinders are connected by 1 or 2 bridge parts, so that the heat dissipation path becomes as long as possible.

More particularly, as illustrated in FIG. 9A through FIG. 9C, at least 2 hollow cylinders 415 and 418 having different diameters are provided in an outer periphery of a shaft supporting cylinder 412 of the tip end shaft 411. Bridge parts 413A and 413B connecting the shaft supporting cylinder 412 and the hollow cylinder 415 of the heat dissipating mechanism 410, or bridge parts 416A and 416B connecting the plurality of hollow cylinders 415 and 418, are examples of 1 bridge part or 2 collinear bridge parts that are separated from each other and connect the respective hollow cylinders. Inner approximately annular hollow parts 414 and 414, and outer approximately annular hollow parts 417 and 417 are formed between the plurality of hollow cylinders at parts where no bridge part is provided.

In a case in which 2 or more different hollow cylinders are provided in the outer periphery of the shaft supporting cylinder 412 that supports the tip end shaft 411, the 1 or 2 bridge parts 413A and 413B connecting an arbitrary hollow cylinder (intermediate diameter hollow cylinder) and a hollow cylinder located at the inner part (shaft supporting cylinder 412), and the 1 or 2 bridge parts 416A and 416B connecting the arbitrary hollow cylinder (intermediate diameter hollow cylinder 415) and a hollow cylinder located at the outer part (large diameter hollow cylinder 418), are arranged with an angular difference 90°.

Accordingly, in the third member 400 having the heat dissipating structure, the heat is transmitted from the central part toward the outer part of the hollow cylinders while taking detours, similarly as in the case of the first member 10 illustrated in FIG. 7A.

More particularly, the heat transmitted from the tip end shaft 411 located at the central part passes through the shaft support cylinder 412 in the heat dissipating mechanism 410 of the third member 400, and after passing through the shaft support cylinder 412, passes through the 2 bridge parts 413A and 413B, to be transmitted to the medium diameter hollow cylinder 415. The heat then passes through ¼ the circumference of the medium diameter hollow cylinder 415, and is thereafter transmitted to the bridge parts 416A and 416B located at the outermost part, to be transmitted to the large diameter hollow cylinder 418 located at the outer part.

The heat from the heat dissipating mechanism 410 is transmitted to a support part 420, that is connected to the large diameter hollow cylinder 418 located at the outer part, by screws 421 connecting the large diameter hollow part 418 and a flange 419. Hence, the heat is transmitted from the outer part toward the central part of the hollow cylinders while transferring heat by all surfaces, to be transmitted to the rotational shaft 430.

In this modification, the rotational shaft 430 is integrally formed on the gear 81 with the integral shaft, illustrated in FIG. 3A.

By providing the heat dissipating structure in all of the members including the third member, as in this modification illustrated in FIG. 8A through FIG. 9C, it is possible to further improve the heat dissipation efficiency compared to the configuration of the first embodiment illustrated in FIG. 3A through FIG. 7B. Hence, it is possible to further improve the heat insulation efficiency of the heat transmitted from the driven body toward the driving source.

In the configuration illustrated in FIG. 3A through FIG. 7B, the heat dissipating structure is provided in two members, namely, the first member and the second member. On the other hand, in the configuration of this embodiment illustrated in FIG. 8A through FIG. 9C, the heat dissipating structure is provided in all of the first, second, and third members. However, the heat dissipating structure may be provided in at least one of the first, second, and third members, according to the extent of the required heat dissipation.

For example, in a case in which there is little demand for heat dissipation, or in a case in which there is a margin in space for the third member, the heat dissipating structure not forming the Oldham interfitting may be omitted in the first member and/or the second member. For example, the bridge parts 13A and 13B and the intermediate diameter hollow cylinder 15 of the first member 10 may be omitted. Alternatively, the bridge parts 36A and 36B and the intermediate diameter hollow cylinder 35 of the second member 30 may be omitted.

In the Oldham mechanism of the first embodiment described above, the first member 10 has the male-type disk structure provided with the protruding part, the second member 30 has the female-type disk structure that caves in from both sides along the rotational axis direction, and is provided with the notch parts for making sliding contact formed in different directions, and the third member 40 has the male-type structure provided with the protruding part. However, the combination of the protruding parts and the notch parts used for the fitting is not limited to the above described combination.

More particularly, the first protruding part (Oldham bridge parts 16A and 16B) that protrudes in the coaxial direction parallel to the rotational shaft and extends in the first direction X that is the diametrical direction of the rotational shaft, may be provided on one of the first member and the second member. In addition, the first notch part fitted to the first protruding part and slidable in the first direction X along the first protruding part, may be provided on the other of the first member and the second member.

In addition, the second notch part, extending in the second direction Y may be provided on one of the second member and the third member. Further, the second protruding part fitted to the second notch part and slidable in the second direction Y along the second notch part may be provided on the other of the second member and the third member.

A description will be given hereinafter of embodiments in which the combination of the protruding parts and the notch parts used for the fitting in the Oldham mechanism are modified.

Second Embodiment

Figure 10:
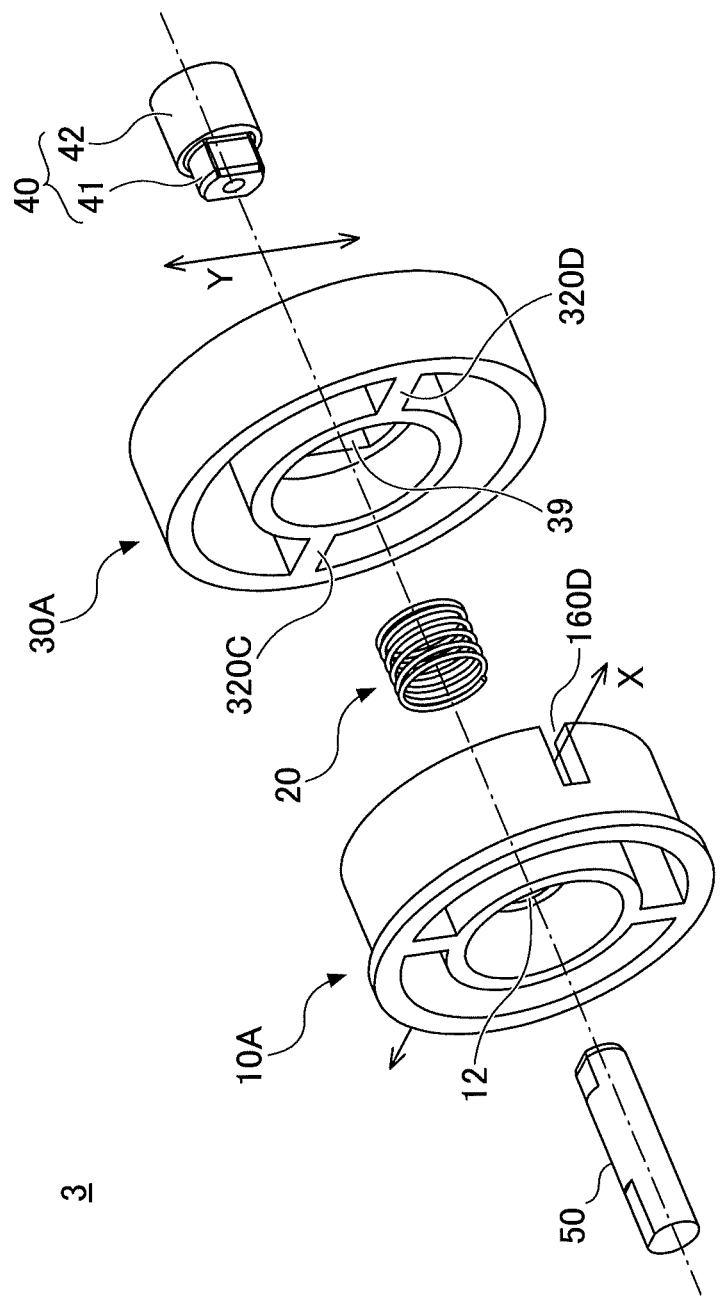
FIG. 10 is a diagram for explaining an example of the Oldham coupling in a second embodiment of the present invention.

FIG. 10 is a diagram for explaining an example of an Oldham coupling 3 in a second embodiment of the present invention.

In the Oldham mechanism of the Oldham coupling 3 in the second embodiment, a first member 10A has a female-type disk structure provided with a first notch part. A second member 30A has a male-and-female type disk structure provided with a first protruding part protruding in one direction (toward the first member), and a first notch part (fitting hole) caving in in the other direction (toward the third member). The third member 40 has the male-type structure provided with the protruding part (projection).

More particularly, as illustrated in FIG. 10, the fitting hole 12 is formed in the first member (shaft joint, first hub) 10A of the Oldham coupling 3, and the rotational shaft 50 of the exhaust valve 71 that is the one connecting destination is fit into the fitting hole 12 and is fixed to the first member 10A, similarly as in the case of the first embodiment.

First notch parts 160C (not illustrated) and 160D (refer to FIG. 10), that cave in in a direction opposite to the opening direction of the fitting hole 12, are formed in the first member 10A. Although the first notch part 160C is not visible in FIG. 10, the first notch part 160C, that fits a first protruding part 320C of the second member 30A, is formed on the left side of the first member 10A in FIG. 10. More particularly, the 2 first notch parts 160C and 160D, separated from each other and collinear in the first direction X, and including notch sidewalls parallel to the first direction X, are formed on the outermost hollow cylinder of the first member 10A.

In addition, in this embodiment, first protruding parts 320C and 320D, that fit to the first notch parts (concave parts) 160C and 160D of the first member 10A, are formed in the second member (joint, relay joint) 30A. The first protruding parts 320C and 320D of the second member 30A extend in the first direction X that is the diametrical direction of the rotational shaft 50. More particularly, in the second member 30A, 2 outermost bridge parts, that are separated from each other and collinear in the first direction X, and connect the outermost hollow cylinder and the hollow cylinder second from the outer part, function as the first protruding parts 320C and 320D having edge parts parallel to the first direction X.

The first notch parts 160C and 160D of the first member 10A are slidable in the first direction X along the first protruding parts 320C and 320D of the second member 30A.

Further, a connecting hole (second notch part) 39, similar to that of the first embodiment, but caves in in a direction opposite to the direction in which the first protruding parts 320C and 320D protrude, is formed in the second member 30A. The connecting hole 39 is elongated in the second direction Y that is perpendicular to the first direction X, that is, elongated in the diametrical direction of the rotational shaft 50. In other words, the connecting hole 39 extends in the second direction Y.

A tip end shaft (second protruding part) 41, similar to that of the first embodiment, is provided on the third member (actuator-end shaft) 40. The tip end shaft (second protruding part) 41 fits into the connecting hole 39 of the second member 30A, and connects to the rotational shaft 42 of the actuator 8. The tip end shaft 41 is slidable in the second direction Y along the connecting hole (second notch part) 39 of the second member 30A.

In this embodiment, the first member 10A and the second member 30A have the heat dissipating structure including a plurality of concentric hollow cylinders (double hollow cylinder structure) that have different diameters and are mutually separated, and in which the plurality of hollow cylinders are connected by the bridge parts.

Third Embodiment

Figure 11:
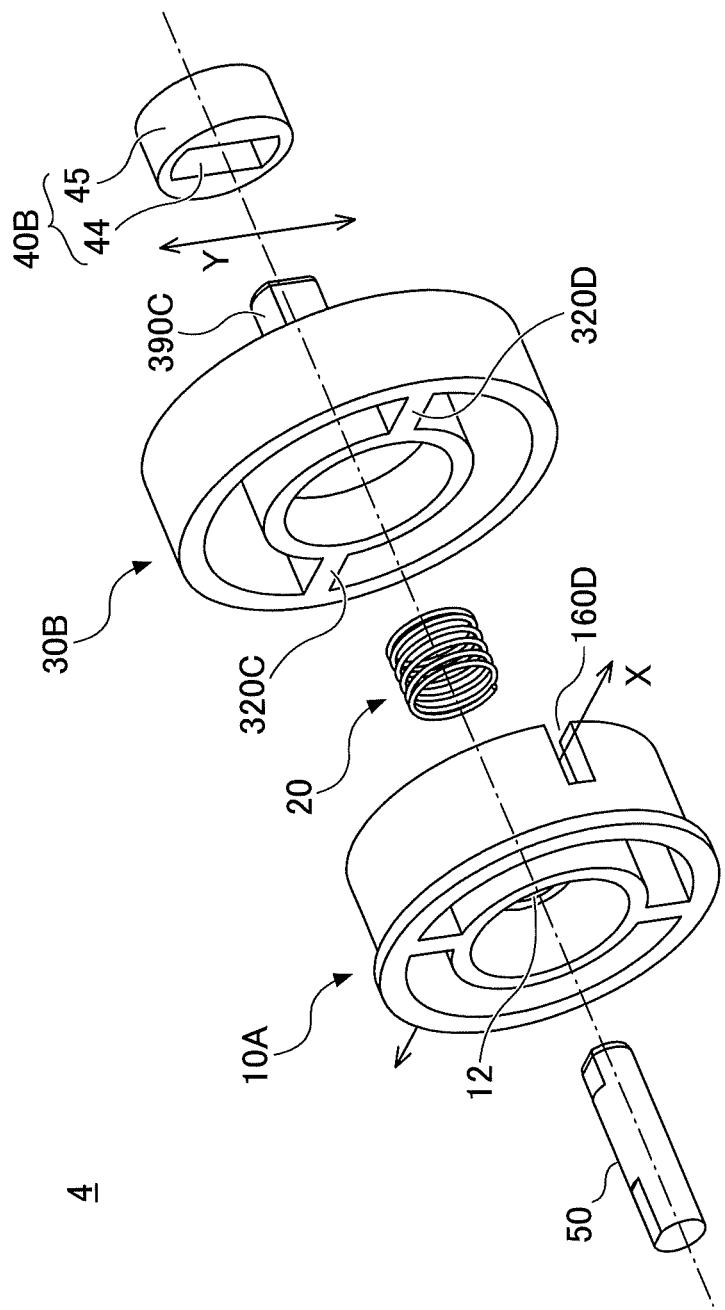
FIG. 11 is a diagram for explaining an example of the Oldham coupling in a third embodiment of the present invention.

FIG. 11 is a diagram for explaining an example of an Oldham coupling 4 in a third embodiment of the present invention.

In the Oldham mechanism of the Oldham coupling 4 in the third embodiment, a first member 10A has a female-type disk structure provided with a notch part, similarly as in the case of the second embodiment. A second member 30B has a male-and-male type disk structure provided with protruding parts protruding in opposite directions and extending in different directions. A third member 40B has a female-type structure provided with a notch part.

More particularly, as illustrated in FIG. 11, a fitting hole 12 is formed in the first member (shaft joint, first hub) 10A of the Oldham coupling 4, and the rotational shaft 50 of the exhaust valve 71 that is the one connecting destination is fit into the fitting hole 12 and is fixed to the first member 10A, similarly as in the case of the second embodiment. First notch parts 160C (not illustrated) and 160D, that cave in in a direction opposite to the opening direction of the fitting hole 12, are formed in the first member 10A. More particularly, the 2 first notch parts 160C and 160D, separated from each other and collinear in the first direction X, and including notch sidewalls parallel to the first direction X, are formed on the outermost hollow cylinder of the first member 10A.

In addition, in this embodiment, first protruding parts 320C and 320D, that fit to the first notch parts 160C and 160D of the first member 10A, are formed in the second member (joint, relay joint) 30B. The first protruding parts 320C and 320D of the second member 30B extend in the first direction X that is the diametrical direction of the rotational shaft 50. More particularly, in the second member 30B, 2 outermost bridge parts, that are separated from each other and collinear in the first direction X, and connect the outermost hollow cylinder and the hollow cylinder second from the outer part, function as the first protruding parts 320C and 320D having edge parts parallel to the first direction X.

The first notch parts 160C and 160D of the first member 10A are slidable in the first direction X along the first protruding parts 320C and 320D of the second member 30B.

In FIG. 10 and FIG. 11, in order to make the outermost hollow cylinder of the first member 10A formed with the first notch parts 160C and 160D slidable in the first direction X along the first protruding parts 320C and 320D that are formed by the outermost bridge parts of the second member 30A (30B), the diameter of the outermost hollow cylinder of the first member 10A is smaller than the diameter of the outermost hollow cylinder of the second member 30A (30B) in these embodiments.

In addition, in the second and third embodiments, the Oldham coupling 3 (4) is interposed between the 2 connecting destinations (refer to FIG. 2), in a state in which the first notch parts 160C and 160D of the first member 10A stride over the first protruding parts 320C and 320D that are formed by the outermost bridge parts of the second member 30A (30B). Hence, the thickness of the outermost hollow cylinder of the first member 10A, formed with the first notch parts 160C and 160D, is smaller than a distance of the spacing between the outermost hollow cylinder and the hollow cylinder located second from the outer part of the second member 30A (30B).

Accordingly, in the second and third embodiments, the notch sidewalls of the first notch parts 160C and 160D in the outermost hollow cylinder of the first member 10A are slidable in the first direction X along the edge parts of the first protruding parts 320C and 320D that are formed by the outermost bridge parts of the second member 30A (30B), by the distance of the spacing described above.

In addition, the relationship of the notch parts and the protruding parts in these embodiments when fitting the first member and the second member together is opposite to that of the first embodiment. In the first member 10A illustrated in FIG. 10 and FIG. 11, the end face of the outermost hollow cylinder, facing the second member 30A (30B) (one end), protrudes closer toward the second member 30A (30B) than the end face of the hollow cylinder located at the inner part and the end face of the bridge parts of the second member 30A (30B), as illustrated in FIG. 6C and FIG. 6D for the second member 30. According to this configuration, constituent elements located at the inner part of the first member 10A are prevented from interfering with the sliding of the outermost hollow cylinder of the first member 10A in the first direction X along the first protruding parts 320C and 320D of the second member 30A (30B).

Further, in the third embodiment, the second member 30B is provided with a second protruding part 390C that protrudes in the direction opposing to the protruding direction of the first protruding parts 320C and 320D, as illustrated on the depth side in FIG. 11. The second protruding part 390C is provided on the slidably connecting hollow cylinder 38 (refer to FIG. 5) that is located at the central part of the second member 30B.

In this embodiment, the third member (actuator-end shaft) 40B includes a connecting hole (second notch part) 44 to which the second protruding part 390C of the second member 30B fits, formed in a rotational shaft 45 of the actuator 8. The connecting hole 44 is elongated in the second direction Y that is perpendicular to the first direction X, that is, elongated in the diametrical direction of the rotational shaft 45. In other words, the connecting hole 44 extends in the second direction Y.

The second protruding part 390C of the second member 30B is slidable in the second direction Y along the connecting hole (second notch part) 44 in the third member 40B.

In this embodiment, the first member 10A and the second member 30B have the heat dissipating structure including a plurality of concentric hollow cylinders (double hollow cylinder structure) that have different diameters and are mutually separated, and in which the plurality of hollow cylinders are connected by the bridge parts.

Fourth Embodiment

Figure 12:
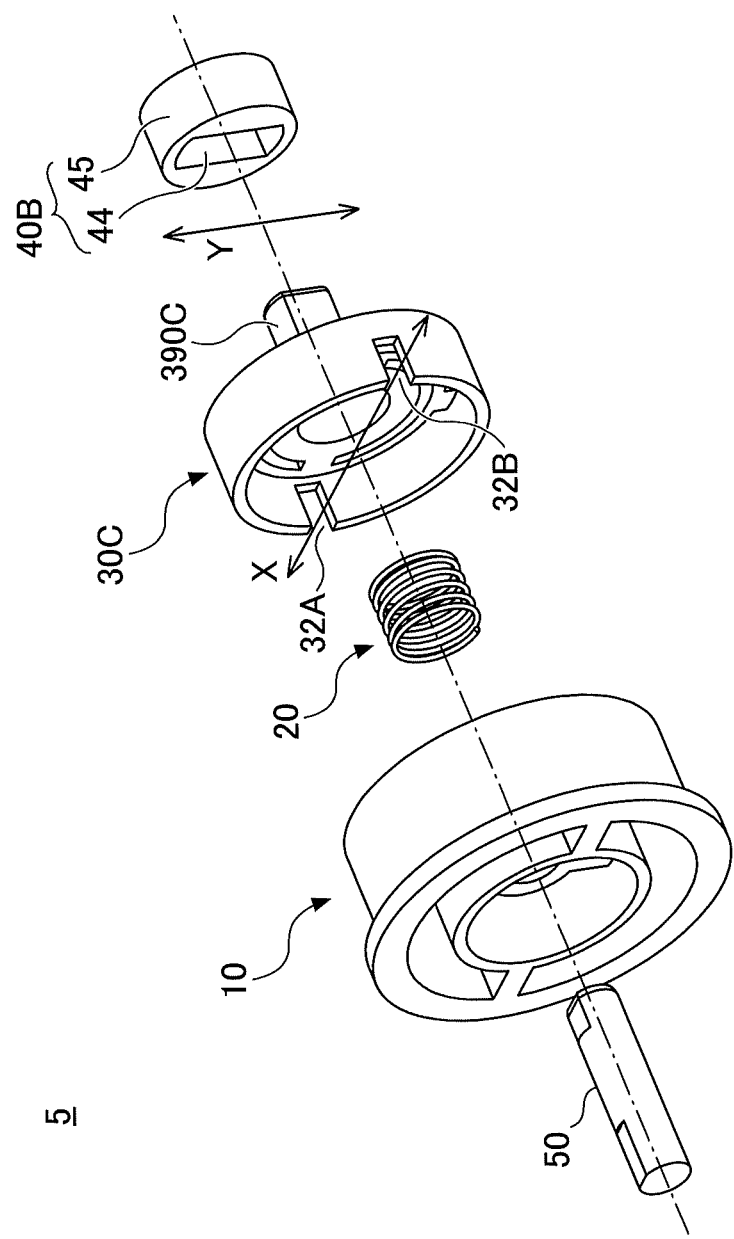
FIG. 12 is a diagram for explaining an example of the Oldham coupling in a fourth embodiment of the present invention.

FIG. 12 is a diagram for explaining an example of an Oldham coupling 5 in a fourth embodiment of the present invention.

In the Oldham mechanism of the Oldham coupling 5 in the fourth embodiment, the first member 10 has the male-type disk structure provided with the protruding part. A second member 30C has a female-and-male type disk structure provided with a first notch part protruding caving in in one direction (toward the first member), and a first protruding part protruding in the other direction (toward the third member). The third member 40B has a female-type structure provided with a notch part.

More particularly, in this embodiment, the configuration of the first member (shaft joint, first bub) 10 of the Oldham coupling 5 is the same as that of the first embodiment. Hence, the first member 10 includes the fitting hole 12, and the Oldham bridge parts (first protruding parts) 16A and 16B (refer to FIG. 3B).

On the front side in FIG. 12, the second member (joint, relay joint) 30B includes the first notch parts 32A and 32B that fit the first protruding parts 16A and 16B of the first member 10, similarly as in the case of the first embodiment. The first notch parts 32A and 32B are slidable in the first direction X along the Oldham bridge parts (first protruding parts) 16A and 16B of the first member 10.

In addition, on the depth side in FIG. 12, the second member 30C is provided with the second protruding part 390C that protrudes in a direction opposite to the direction in which the first notch parts 32A and 32B cave in. The second protruding part 390C is provided on the slidably connecting hollow cylinder 38 (refer to FIG. 5) that is located at the central part of the second member 30B.

The third member (actuator-end shaft) 40B includes the connecting hole (second notch part) 44 to which the second protruding part 390C of the second member 30C fits, formed in the rotational shaft 45 of the actuator 8, similarly as in the case of the third embodiment. The connecting hole 44 is elongated in the second direction Y that is perpendicular to the first direction X, that is, elongated in the diametrical direction of the rotational shaft 45. In other words, the connecting hole 44 extends in the second direction Y.

The second protruding part 390C of the second member 30C is slidable in the second direction Y along the connecting hole (second notch part) 44 in the third member 40B.

As illustrated in FIG. 11 and FIG. 12, in the third and fourth embodiments, the second notch part 44 formed in the third member 40B is an I-shaped or rectangular shaped hole having notch sidewalls parallel to the second direction Y.

In addition, the relationship of the notch parts and the protruding parts in these embodiments when fitting the second member and the third member together is opposite to that of the first embodiment. In the third and fourth embodiments, the second protruding part 390C provided on the second member 30B (30C) is an I-shaped or rectangular shaped tip end projection having sides parallel to the second direction Y, as illustrated in FIG. 3A and FIG. 3B for the third member 40. Because the sides of the tip end projection parallel to the second direction Y and forming the second protruding part 390C of the second member 30B (30C) are shorter than the notch sidewalls of the second notch part 44 of the third member 40B, the second protruding part 390C is slidable in the second direction Y along the second notch part 44 of the third member 40B.

Further, similarly as in the case of the second member 30 illustrated in FIG. 6A through FIG. 6D, in the configurations illustrated in FIG. 11 and FIG. 12 in which the second protruding part 390C is provided on the second members 30B and 30C to protrude toward the third member 40B, the end part of the central hollow cylinder (slidably connecting hollow cylinder 38) to which the second protruding part 390C is mounted, facing the first member 10 (10A), caves in with respect to the hollow cylinder located at the outer part and the bridge parts.

Accordingly, even in the cases in which the second protruding part 390C is provided on the second members 30B and 30C, it is possible to provide the spring 20 between the hollow cylinder (slidably connecting hollow cylinder 38) located at the central part of the second member 30B (30C), and the fixedly connecting hollow cylinder 11 located at the central part of the first member 10 (10A).

In this embodiment, the first member 10 and the second member 30C have the heat dissipating structure including a plurality of concentric hollow cylinders (double hollow cylinder structure) that have different diameters and are mutually separated, and in which the plurality of hollow cylinders are connected by the bridge parts.

FIG. 11 and FIG. 12 illustrate examples in which the third member 40B does not have the heat dissipating structure. However, the third member 40B including the connecting hole (second notch part) 44 may also have a heat dissipating structure, as in the example illustrated in FIG. 8A through FIG. 9C.

The number of hollow cylinders and the number of bridge parts in the embodiments illustrated in FIG. 10 through FIG. 12 are examples. The number of hollow cylinders may be increased, the number of bridge parts may be reduced, and the height (length) of the hollow cylinders may be increased, according to the extent of the required heat dissipation for reducing the temperature, the required strength, or the like.

The Oldham coupling is described above based on each of the embodiments, however, the present invention is not limited to the described embodiments, and various variations and modifications may be made without departing from the scope of the present invention.

FIG. 2 illustrates the exhaust valve and the actuator as examples of the connecting destinations of the Oldham coupling according to the embodiments. However, the disclosed Oldham coupling may be applied to the connection between other 2 connecting destinations, such as between one connecting destination operating at a high-temperature environment, and the other connecting destination operating at a low-temperature environment (for example, 200° C. or lower). By using the disclosed Oldham coupling between such other 2 connecting destinations having different operating temperatures, the heat dissipation structure can make the heat transfer difficult, while tolerating the shaft misalignment by the Oldham coupling, to achieve heat insulation between the connecting destinations.

According to each of described embodiments, it is possible to provide an Oldham coupling capable of taking measures against shaft misalignment using a compact configuration, and having a high heat dissipation efficiency between the connecting ends.

The present invention is described above based on each of the embodiments, however, the present invention is not limited to the requirements of the described embodiments. The present invention may be modified without departing from the scope of the present invention, and may be appropriately varied depending on applications of the present invention.

What is claimed is:

1. A coupling that transmits a torque between opposing shaft ends of rotational shafts at two connecting destinations having different operating temperatures, by being interposed between the opposing shaft ends, comprising:
   a first member to which a first rotational shaft of one of the two destinations is connected, a second member, and a third member to which a second rotational shaft of the other of the two destinations is connected,
   wherein a first protruding part, protruding in a coaxial direction parallel to the first rotational shaft and extending in a first direction that is a diametrical direction of the first rotational shaft, is provided in one of the first member and the second member, and the other of the first member and the second member includes a first notch part fitted to the first protruding part and slidable in the first direction along the first protruding part,
   wherein a second notch part, extending in a second direction that is the diametrical direction of the second rotational shaft and perpendicular to the first direction, is formed in one of the second member and the third member, and the other of the second member and the third member includes a second protruding part fitted to the second notch part and slidable in the second direction along the second notch part,
   wherein at least one of the first member, the second member, and the third member has a heat dissipating structure, as a constituent element thereof,
   wherein the heat dissipating structure includes a plurality of concentric hollow cylinders that have different diameters, are mutually separated, and connected by bridge parts, and
   wherein at least one of the plurality of concentric hollow cylinders has a height along the coaxial direction greater than a depth along the coaxial direction of the first notch part.

2. The coupling as claimed in claim 1, wherein
   the first member is provided with a fixedly connecting hollow cylinder, that is located at a central part of the first member, and includes a fitting hole into which the first rotational shaft at the one of the two destinations is fixedly connected, and
   the second member is provided with a slidably connecting hollow cylinder, that is located at a central part of the second member, and includes the second protruding part or the second notch part fitted to the second notch part or the second protruding part of the third member and slidable in the second direction.

3. The coupling as claimed in claim 2, wherein the one of the first member and the second member provided with the first protruding part includes the heat dissipating structure including at least one hollow cylinder located at an outer periphery of the fixedly connecting hollow cylinder or the slidably connecting hollow cylinder and having a diameter greater than a diameter of the fixedly connecting hollow cylinder or the slidably connecting hollow cylinder, and the bridge parts connecting a plurality of hollow cylinders, wherein two outermost bridge parts that are collinear, separated from each other and extending in the first direction, and connecting an outermost hollow cylinder located at an outermost part and a hollow cylinder located second from an outer part, also function as the first protruding part having edge parts parallel to the first direction.

4. The coupling as claimed in claim 3, wherein the one of the first member and the second member provided with the first protruding part includes the heat dissipating structure including two or more hollow cylinders having different diameters, on an outer periphery of the fixedly connecting hollow cylinder or the slidably connecting hollow cylinder, and the bridge parts connecting the plurality of hollow cylinders, other than the two outermost bridge parts, including one or two bridge parts that are collinear, separated from each other, and connect the respective hollow cylinders, wherein one or two bridge parts connecting an arbitrary hollow cylinder and a hollow cylinder located at an inner part, and one or two bridge parts connecting the arbitrary hollow cylinder and a hollow cylinder located at the outer part, are arranged with an angular difference.

5. The coupling as claimed in claim 3, wherein the other of the first member and the second member provided with the first notch part includes the heat dissipating structure including at least one hollow cylinder located at the outer periphery of the slidably connecting hollow cylinder or the fixedly connecting hollow cylinder and having a diameter greater than a diameter of the slidably connecting hollow cylinder or the fixedly connecting hollow cylinder, and the bridge parts connecting a plurality of hollow cylinders, wherein one or two bridge parts that are collinear and connecting the plurality of hollow cylinders, are separated from each other and connect the respective hollow cylinders, wherein the outermost hollow cylinder includes two collinear first notch parts separated from each other and extending in the first direction, and having notch sidewalls parallel to the first direction, and wherein an end face of the outermost hollow cylinder of the one of the first member and the second member, facing the one of the first member and the second member, protrudes closer toward the one of the first member and the second member than an end face of the hollow cylinder located at the inner part of the one of the first member and the second member.

6. The coupling as claimed in claim 5, wherein the other of the first member and the second member provided with the first notch part includes the heat dissipating structure including two or more hollow cylinders having different diameters, on an outer periphery of the slidably connecting hollow cylinder or the fixedly connecting hollow cylinder, and the bridge parts connecting the plurality of hollow cylinders, including one or two bridge parts that are collinear, separated from each other, and connect the respective hollow cylinders, wherein one or two bridge parts connecting an arbitrary hollow cylinder and a hollow cylinder located at the inner part, and one or two bridge parts connecting the arbitrary hollow cylinder and a hollow cylinder located at the outer part, are arranged with an angular difference.

7. The coupling as claimed in claim 5, wherein the coupling is interposed between the two connecting destinations in a state in which the first notch part of the other of the first member and the second member, having the notch sidewalls parallel to the first direction, strides over the outermost bridge parts of the one of the first member and the second member, a thickness of the outermost hollow cylinder of the other of the first member and the second member, including the first notch part, is smaller than a distance of a spacing between the outermost hollow cylinder and a hollow cylinder located second from the outer part of the one of the first member and the second member, and the notch sidewalls of the first notch part in the outermost hollow cylinder of the other of the first member and the second member, is slidable in the first direction by the distance of the spacing, along edge parts of the outermost bridge parts of the one of the first member and the second member.

8. The coupling as claimed in claim 5, wherein in the second member, a part of an end face of the slidably connecting hollow cylinder, facing the third member, and surrounding at least the second notch part or the second protruding part, protrudes closer toward the third member than an end face of the hollow cylinder located at the outer part and an end face of each of the bridge parts respectively facing the third member, the part on the inner part protruding closer toward the third member is configured to cave in further away from the first member than the end faces of the hollow cylinder located at the outer part and the bridge parts, to form a caved-in part, and a spring is provided between the caved in part of the slidably connecting hollow cylinder and the fixedly connecting hollow cylinder of the first member.

9. The coupling as claimed in claim 1, wherein the second notch part formed in the one of the second member and the third member has notch sidewalls parallel to the second direction.

10. The coupling as claimed in claim 9, wherein the second protruding part provided on the other of the second member and the third member includes an I-shaped or rectangular shaped tip end projection having sides that are parallel to the second direction and are shorter than the notch sidewalls of the second notch part.

11. The coupling as claimed in claim 9, wherein the second notch part or the second protruding part of the third member is provided on a tip end shaft, and the tip end shaft is integrally formed on the second rotational shaft at the other connecting destination.

12. The coupling as claimed in claim 9, wherein the second notch part or the second protruding part of the third member is provided on a tip end shaft, and the third member includes the heat dissipating structure including
  two or more hollow cylinders having different diameters, on an outer periphery of the tip end shaft, and
  the bridge parts connecting the tip end shaft and the hollow cylinder, or the plurality of hollow cylinders, including one or two bridge parts that are collinear, separated from each other, and connect the respective hollow cylinders,
wherein one or two bridge parts connecting an arbitrary hollow cylinder and a hollow cylinder located at an inner part, and one or two bridge parts connecting the arbitrary hollow cylinder and a hollow cylinder located at the outer part, are arranged with an angular difference.

13. The coupling as claimed in claim 1, wherein
the two connecting destinations include a driving source and a driven body, and
the operating temperature of the driven body is higher than the operating temperature of the driving source.

* * * * *